United States Patent [19]
Sakamoto et al.

[11] Patent Number: 5,267,055
[45] Date of Patent: Nov. 30, 1993

[54] IMAGE SIGNAL PROCESSING APPARATUS

[75] Inventors: Masahiro Sakamoto, Tokyo; Yasuyuki Shinada; Shinichi Ishida, both of Yokohama, all of Japan

[73] Assignee: Canon Kabushiki Kaisha, Tokyo, Japan

[21] Appl. No.: 758,198

[22] Filed: Sep. 12, 1991

Related U.S. Application Data

[63] Continuation of Ser. No. 350,039, May 4, 1989, abandoned.

[30] Foreign Application Priority Data

| May 11, 1988 | [JP] | Japan | 63-115761 |
| May 11, 1988 | [JP] | Japan | 63-115762 |
| May 11, 1988 | [JP] | Japan | 63-115763 |

[51] Int. Cl.⁵ .......................................... H04N 1/40
[52] U.S. Cl. ............................. 358/461; 358/448; 382/54
[58] Field of Search ............... 358/447, 448, 460, 461, 358/463, 464, 444; 382/50, 54

[56] References Cited
U.S. PATENT DOCUMENTS

| 4,554,583 | 11/1985 | Saitoh et al. | 358/461 |
| 4,672,682 | 6/1987 | Naruse et al. | 358/464 |
| 4,774,590 | 9/1988 | Haganuma et al. | 358/444 |
| 4,827,533 | 5/1989 | Tanaka | 382/54 |
| 4,896,222 | 1/1990 | Fukai | 358/447 |

FOREIGN PATENT DOCUMENTS

| 0039899 | 11/1981 | European Pat. Off. | 358/461 |
| 0104370 | 6/1982 | Japan | 358/461 |

Primary Examiner—Edward L. Coles, Sr.
Assistant Examiner—Jerome Grant, II
Attorney, Agent, or Firm—Fitzpatrick, Cella, Harper & Scinto

[57] ABSTRACT

An image processing apparatus has an image sensor for inputting image data obtained by reading an image, a shading correction processing unit for correcting variations in image data input from the image sensor on the basis of correction data, an arithmetic operation processing unit for performing image processing of the image data input from the image sensor, and a memory for storing the correction data to be supplied to the shading correction processing unit and image data to be supplied to the arithmetic operation processing unit.

18 Claims, 16 Drawing Sheets

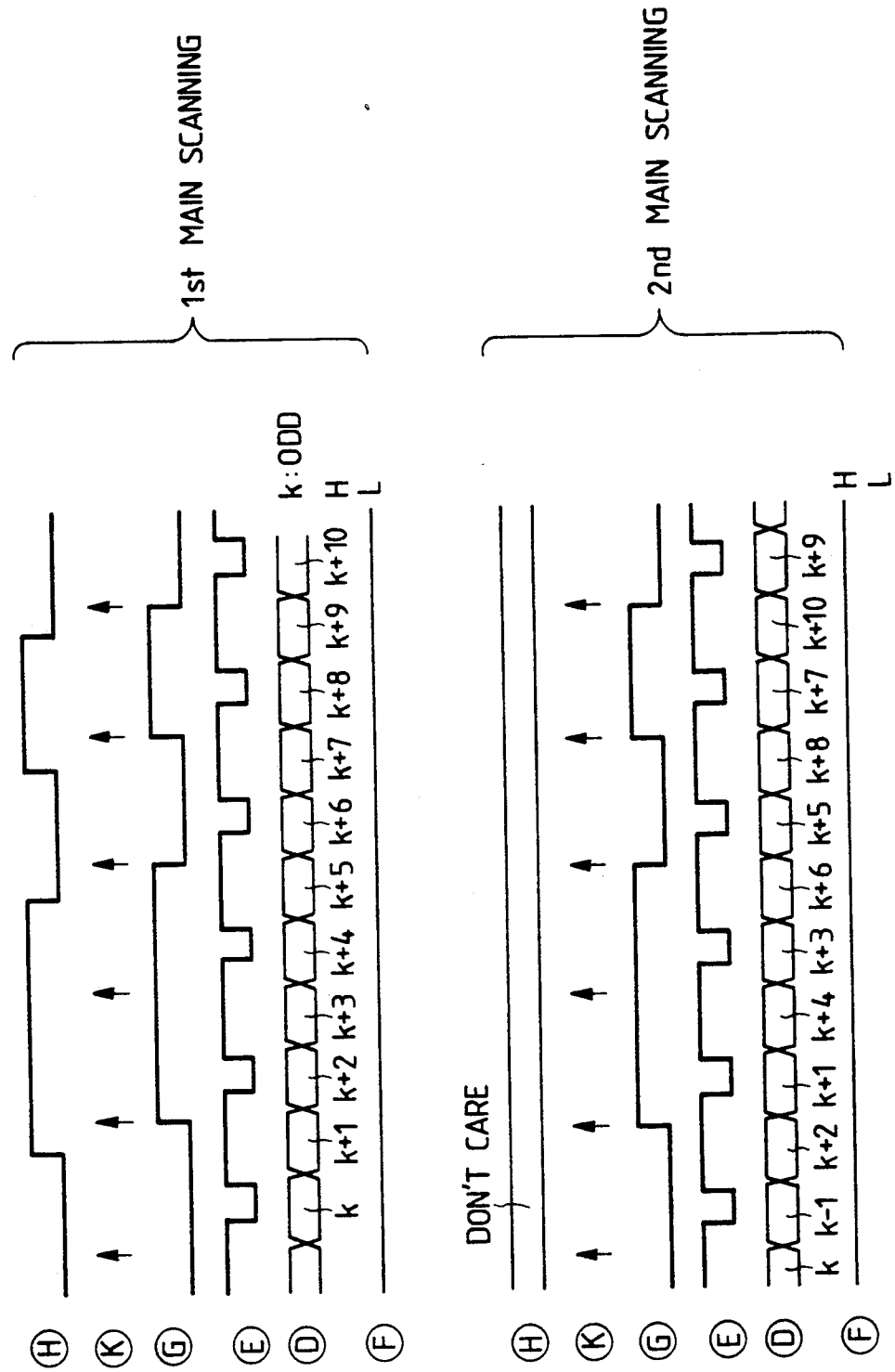

IMAGE SIGNAL PROCESSING APPARATUS

This application is a continuation of application Ser. No. 07/350,039, filed May 4, 1989, now abandoned.

BACKGROUND OF THE INVENTION

I. Field of the Invention

The present invention relates to an image signal processing apparatus such as a facsimile machine or a digital copying machine for electrically processing an original image.

II. Description of the Related Art

Conventional apparatuses for electrically performing various types of image processing are exemplified by facsimile machines and copying machines. In most of these apparatuses, an original is illuminated by a light source, and light reflected by the original is read by using an image sensor such as a CCD sensor.

In order to perform, e.g., edge emphasis and smoothing for image data input every line, images on an image data line to be processed and lines before and after the image data line to be processed are stored, and the stored image data of a plurality of lines are read out. Image data of a pixel of interest and image data of pixels adjacent to the pixel of interest are obtained.

In a conventional image processing apparatus of this type, memory ICs 20, 21, and 22 having the same number as that of lines required to be stored are used, as shown in FIG. 1. In an arrangement of FIG. 1, four adjacent pixels A, B, C, and D of the immediately preceding and next lines of a pixel X of interest are used to perform image processing by matrix calculations, as shown in FIG. 2. If the line having the pixels C and D is the (n+2)th line, image data latched by D flip-flops 26 and 28 as data of the pixels C and D are sampled in response to pixel clocks Ⓑ, as shown in FIG. 3, and the sampled data are input to an arithmetic operation processing unit 41. The data of the pixel X is stored in a memory on the (n+1)th line in accordance with a write signal Ⓔ, as shown in FIG. 3. Of the image data of the immediately preceding line which are currently read out from the memory 20, the image data latched by a D flip-flop 30 is selected by a selector 39 and input to the arithmetic operation processing unit 41. The data of the pixels A and B are currently stored in the memory 22 as data on the nth line in accordance with a write signal Ⓓ, as shown in FIG. 9. Of the image data on the second previous line which are currently read out from the memory 22, the image data latched by D flip-flops 35 and 37 are selected by selectors 40 and 38 and input to the arithmetic operation processing unit 41. The image data processed by the arithmetic operation processing unit 41 is output as f(A,B,C,D,X).

The currently input image data of the (n+2)th line is stored in the memory 21 in accordance with a write signal Ⓕ, as shown in FIG. 9, and are processed the X data of the (n+3)th line and the A and B data of the (n+4)th line. The arrangement in FIG. 1 also includes D flip-flops 27, 29, 31, and 32 to 34, a D flip-flop 36, tristate buffers 23 to 25 for controlling inputs to the input image data memories 20 to 22, and a timing clock generator 42 for outputting clock pulses for operating the D flip-flops 26 to 37, a read/write address signal to the memories 20 to 22, and control signals to the tristate buffers 23 to 25 and the selectors 38 to 40.

The arrangement in FIG. 1 is satisfactory in image processing but poses several problems below:

(1) The circuit is large and complicated;

(2) Since one memory IC is used for a one-line image memory, utilization efficiency of the memory is poor, resulting in high cost (e.g., when versatile ICs are used to perform processing of image data having 2.5 K pixels at a resolution of 8 bits, three 8×8 Kbit memories are required); and (3) Since separate data buses are connected to the respective memories, the number of pins is increased even if the memories are arranged as an LSI.

In order to correct level variations between pixels of level data input to an image processing unit 47 shown in FIG. 1, data representing variations in one-line image data is stored, and level correction is performed on the basis of variation data stored in correspondence with the input image data.

Correction of this type is conventionally called shading correction, and a shading correction circuit is shown in FIG. 4. Distortion correction data associated with a shading correction processing unit 46 and image processing data associated with the image processing unit 47 are read/write accessed with respect to independent memories 48 and 49 in response to different timing clocks from a timing clock generator 43 shown in FIG. 5. The shading correction circuit is used as an entirely independent block. The shading correction circuit includes tristate buffers 44 and 45.

In the arrangement described above, as is apparent from FIG. 4, independent memories must be used to form a shading correction processing data memory 49 and an image data memory 48, increasing the cost and resulting in a bulky apparatus. When these types of data are stored in a common memory IC, shading correction data stored prior to a read operation of an original is undesirably updated by image data stored during reading of the original.

It is difficult to obtain a uniform amount of light throughout the area of a light source such as a fluorescent lamp. Uniform read signals cannot be often read due to a nonuniform distribution of lens transmittance caused by vignetting and nonuniformity in sensitivity of the light-receiving element. According to the present invention, nonuniformity of the read signal is called shading distortion. Therefore, in order to obtain an excellent read signal, a mechanism for electrically correcting shading distortion is proposed.

Shading distortion is often conventionally corrected by a circuit shown in FIG. 6. An image sensor 301 such as a CCD sensor receives light reflected by an original. Basically, light beams reflected by predetermined areas are sequentially caused to be incident on the image sensor 301 while the original or the sensor is moved. An output from the image sensor 301 is amplified by an amplifier 303, and the amplified signal is compared by a comparator 317 with a slice level formed by a rheostat 315. A comparison result is output as a binary signal.

Read errors often occur due to shading error caused by variations in amount of light emitted from the light source and variations in sensor. Therefore, the circuit shown at the center of FIG. 6 is arranged.

An output 303a from the amplifier 303 is input to an A/D converter 309 and a peak hold circuit 313, and the A/D converter 309 converts the output from the amplifier 303 into a digital signal having a predetermined number of bits. The digital signal is output to a memory 307. The data stored in the memory 307 is converted into analog data by a D/A converter 311. The peak hold circuit 313 holds a maximum value of the read signal, and an output 313a therefrom is supplied to the A/D converter 309 and the D/A converter 311 as A/D and D/A conversion reference values. An analog signal output from the D/A converter 311 is applied to the rheostat 315 and is used as the slice level for binarization by the comparator 317.

Data transfer between the memory 307, the A/D converter 309, and the D/A converter 311 is controlled by a read control unit 305 comprising a microcomputer or the like.

In the above arrangement, in order to correct shading distortion and sensitivity variations in the elements of the image sensor 301, a white reference surface such as a white reference board arranged at a predetermined position inside the apparatus is scanned by pre-scanning performed prior to reading of the original image. An output from the image sensor 301 at this time is digitized by the A/D converter 309, and the digital data is temporarily stored in the memory 307. During original reading, the data stored in the memory 307 is converted into an analog voltage by the D/A converter 311. The analog voltage is divided by the rheostat 315 and the divided voltage is used as a slice level.

During reading of the white reference level, the A/D conversion reference voltage is the output 313a from the peak hold circuit 313 which corresponds to a maximum bright portion of a unit line of the white reference surface.

As in the arrangement of FIG. 6, in an apparatus for obtaining shading correction data by using peak-holding a video signal during pre-scanning, since the peak value is held, a discharge time constant of peak holding is set to be large. For this reason, a charge/discharge constant is also large. A potential of a peak hold capacitor and a storage timing of shading correction data are not taken into consideration. A capacitor potential during the power-on operation is unstable.

It takes a relatively long period of time until the capacitor is charged and the peak hold potential is stabilized during pre-scanning. When shading data is stored prior to stabilization of the peak hold potential, correct correction data cannot often be obtained.

When pre-scanning is started upon the power-on operation, shading data is obtained based on an unstable peak value. Therefore, correct shading correction cannot be performed.

As in the arrangement shown in FIG. 6, in an apparatus for obtaining shading correction data by using peak-holding a video signal during pre-scanning, performing shading correction of the held peak value of an image signal during image reading, obtaining a slice level on the basis of the shading-corrected peak value, and performing binarization (multivalue processing), the peak hold circuit performs the same operations during pre-scanning and image reading.

The following problems are posed during reading of the original image, as shown in FIG. 7.

When a highest white level is present in a one-line image as in an area A of an original shown in FIG. 7, and a peak value having a magnitude equal to that during pre-scanning is obtained, as shown in FIG. 8(A), a correct threshold level can be set. However, when a highest white level is absent in a halftone image as in an area B of an original shown in FIG. 7, a maximum value of the image signal is peak-held, and shading correction is performed by using this value as a maximum peak value, thereby setting a threshold level. Therefore, the threshold level is smaller than that obtained based on the highest white level, and the processed image becomes whitish.

As a result, in an original including both patterns of the areas A and B, even if a background color is uniform, stripes having different densities are undesirably formed in the reproduced image by threshold level differences.

SUMMARY OF THE INVENTION

The present invention has been made in consideration of the above situation, and has as its object to provide a simple image processing apparatus capable of performing excellent image processing and excellent correction of image data.

It is another object of the present invention to provide an image processing apparatus capable of performing image processing using image data of a plurality of lines by using a small-capacity memory.

It is still another object of the present invention to provide an image processing apparatus capable of performing satisfactory correction of image data regardless of different image states.

It is still another object of the present invention to provide an image processing apparatus capable of performing various processing operations with a small circuit arrangement.

The above and other objects, features, and advantages of the present invention will be apparent from the following description in conjunction with the accompanying drawings.

BRIEF DESCRIPTION OF THE DRAWINGS

FIG. 12 is a timing chart showing a storage operation of shading correction data;

DETAILED DESCRIPTION OF THE PREFERRED EMBODIMENT

The present invention will be described with reference to a preferred embodiment.

Figure 9:
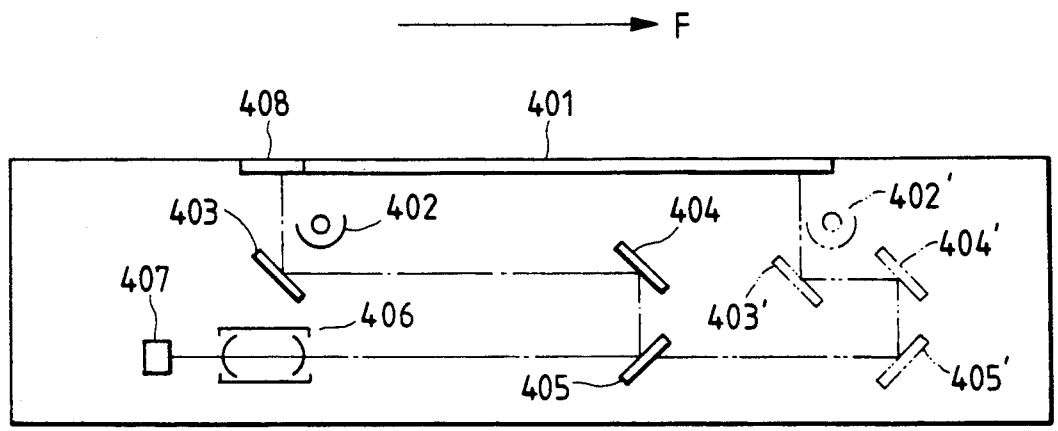
FIG. 9 is a schematic view showing an original reading apparatus.

FIG. 9 is a schematic view showing an original reading apparatus.

The original reading apparatus includes original table glass 401, a rod-like light source 402 such as a halogen lamp or a fluorescent lamp, a first mirror 403, a second mirror 404, a third mirror 405, a lens 406, a one-dimensional solid-state image pickup element (image sensor) 407 such as a CCD sensor, and a white reference surface 408 for shading correction.

An operation of the original reading apparatus will be described below. An image of an original placed on the original table glass 401 is exposed with light from the rod-like light source 402, and a light image is focused by the lens 406 on the image sensor 407 through the first, second, and third mirrors 403, 404, and 405 which scan (subscan) the original. The main scanning direction of the image sensor is perpendicular to the surface of the drawing.

The rod-like light source 402 and the first mirror 403 are integrally supported by a support (not shown) and scan the original surface while being moved in a direction of an arrow F along guide rails (not shown). The second and third mirrors 404 and 405 are integrally supported by a support (not shown). The second and third mirrors 404 and 405 are moved at a speed ½ that of the first mirror 403 along guide rails (not shown) in the same direction as that of the first mirror 403.

The rod-like light source 402, the first mirror 403, the second mirror 404, and the third mirror 405 are moved to positions (402', 403', 404', and 405') indicated by dotted lines. An optical length from the original table glass 401 to the lens 406 through the mirrors 403, 404, and 405 is kept constant.

If signals are sequentially read from light-receiving elements of the image sensor 407 during subscanning, a sequential signal upon raster scanning of the original surface can be obtained.

Figure 10:
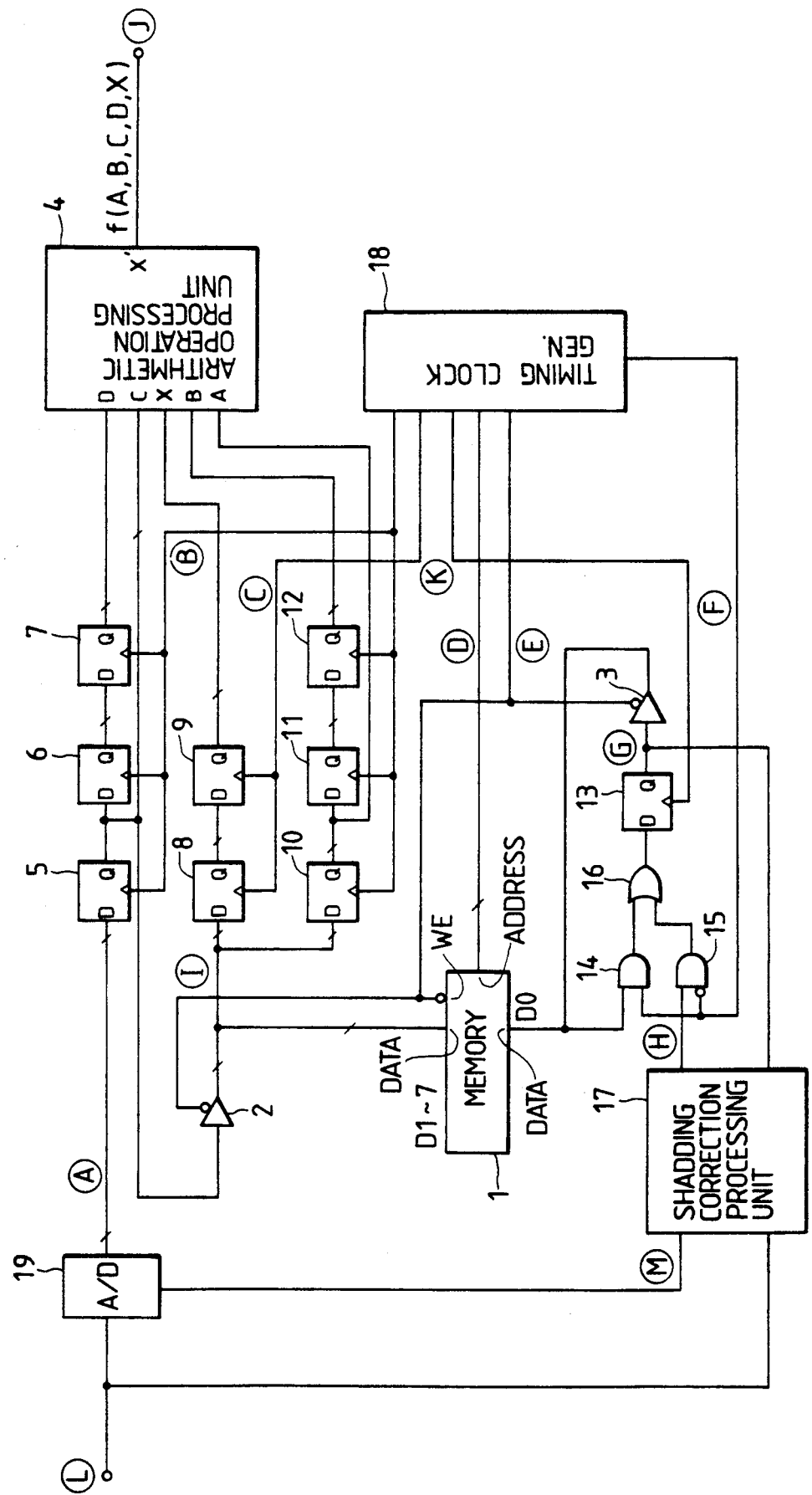
FIG. 10 is a block diagram showing an image processing circuit which employs the present invention.

FIG. 10 is a block diagram of an image processing circuit. The image processing circuit includes a memory 1 for storing image data from the image sensor 407 such as a CCD line sensor and shading correction data, tristate buffers 2 and 3, an arithmetic operation processing unit 4 for performing various image processing operations, D flip-flops 5 to 13, AND gates 14 and 15, an OR gate 16, a shading correction processing unit 17 for correcting shading distortion, a timing clock generator 18 for generating a memory address signal $\textcircled{D}$, a write signal $\textcircled{E}$, D flip-flop latch signals $\textcircled{B}$, $\textcircled{C}$, and $\textcircled{K}$, and a selection signal $\textcircled{F}$ for selecting shading correction data, and an analog-to-digital (A/D) converter 19 for converting an analog image signal from the image sensor 407 to a digital image signal.

The memory 1 receives the address signal $\textcircled{D}$ and the write signal $\textcircled{E}$ from the timing clock generator 18. When the write signal $\textcircled{E}$ is set at low level, data is written at the address position represented by the currently supplied address $\textcircled{D}$. When the write signal $\textcircled{E}$ is set at high level, data is read out from a memory area at the address represented by the currently supplied address signal $\textcircled{D}$.

The write signal $\textcircled{E}$ supplied to the memory 1 is also supplied to the tristate buffers 2 and 3. When the write signal $\textcircled{E}$ is set at low level, the input data is supplied to the memory 1.

When the write signal $\textcircled{E}$ is set at high level, data read access from the memory area at the address represented by the address signal $\textcircled{D}$ is performed. Thereafter, when the write signal $\textcircled{E}$ goes low before updating of the address signal, the data input to the tristate buffers 2 and 3 is written at the address corresponding to a memory area from which the data is read out last.

The memory 1 is a 2-line IC memory RAM for storing data (8 bits/pixel). In this embodiment, a bit D0 of eight bits D0 to D7 is used to store shading data, and the remaining bits, i.e., the bits D1 to D7 are used to store data representing a density of each pixel. When an address data stored in the memory 1 is supplied while the write signal is set at low level, the shading data and the image data which are stored at the accessed address are simultaneously read out.

In the above arrangement, an operation for storing shading correction data will be described. In a normal state, storage of the shading correction data is performed prior to reading of the original by the image sensor 407. Shading correction data is obtained on the basis of the output obtained during reading of the white reference surface 408 by the image sensor 407. The shading correction data is stored in the memory 1. During original reading by the image sensor 407, the stored correction data is read out to perform shading correction of the original read data.

Figure 11:
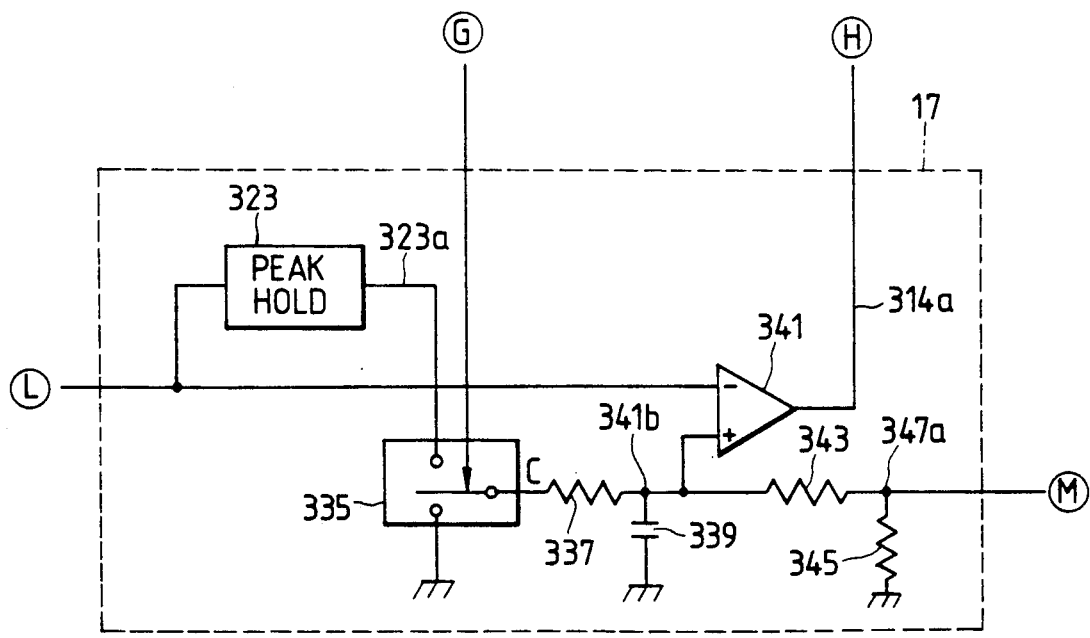
FIG. 11 is a block diagram of a shading correction processing unit.

FIG. 11 is a diagram showing an arrangement of the shading correction processing unit 17 in FIG. 10. An analog image signal $\textcircled{L}$ from the image sensor 407 is input to the shading correction processing unit 17, and an A/D conversion reference signal $\textcircled{M}$ is output from the A/D converter 19. In this embodiment, the reference signal $\textcircled{M}$ of the A/D converter 19 is changed on the basis of the shading correction data obtained by reading the white reference surface 408. Shading distortion included in the read data of the original image is eliminated.

An operation of the arrangement shown in FIG. 11 will be described below.

Referring to FIG. 11, an output from the image sensor 407 is amplified by an amplifier (not shown), and the amplified signal is input to the input terminal of a peak hold circuit 323 and one input terminal of a comparator 341. An output signal line 323a of the peak hold circuit 323 is connected to one contact of an analog switch 335. The other contact of the analog switch 335 is grounded. A charge/discharge circuit consisting of a resistor 337 and a capacitor 339 is connected to the common contact of the analog switch 335. An output from the charge/discharge circuit is connected to the +input terminal of the comparator 341 and is voltage-divided by resistors 343 and 345. The voltage-divided signal serves as the reference signal (M) of the A/D converter 19. That is, a voltage corresponding to the charge voltage of the capacitor 339 is supplied to the A/D converter 19.

An output signal line 341a of the comparator 341 is connected to a gate circuit consisting of the AND gates 14 and 15 and the OR gate 16 shown in FIG. 10. The output on the output signal line 341a serves as correction data (H). That is, an output from the comparator 341 is supplied to one input terminal of the AND gate 15, and output data from the memory 1 is supplied to one input terminal of the AND gate 14. The AND gates 14 and 15 are enabled in response to a switching signal (F) from the timing clock generator 18. A gate input to the AND gate 15 is inverted. Therefore, when one of the AND gates 14 and 15 is enabled, the other AND gate is disabled. Outputs from the AND gates 14 and 15 are input to the OR gate 16, and an OR signal serves as a data input to the D flip-flop 13.

When the switching signal (F) is set at low level, an output 341a from the comparator 341 is selected and output from the OR gate 16. However, when the switching signal (F) is set at high level, the output from the memory 1 is selected and output from the OR gate 16. The timing clock generator 18 sets the switching signal (F) at low level during reading of the white reference surface 408, i.e., during measurement of shading distortion data, and sets it at high level during reading of the original.

The D flip-flop 13 performs latching in response to a latch signal (K) output in synchronism with a one-bit read cycle of the image sensor 407. An output from the D flip-flop 13 is input to the memory 1 through the tristate buffer 3 and to the control terminal of the analog switch 335 (FIG. 11) as a switch signal (G). When the signal (G) is set at low level, the analog switch 335 is connected to the signal line 323a. Read/write timing control of the memory 1 is performed by the write signal (E). Read/write address control of the memory 1 is performed by the address signal (D).

When the image sensor 407 reads the white reference surface 408, the output from the D flip-flop 13 is stored in the memory 1 in accordance with an address value represented by the address signal (D). However, when the original is to be read, the shading distortion data is read out from the memory 1 in synchronism with the read operation of the image sensor 407 in accordance with the address value represented by the address signal (D). In this manner, shading distortion data stored in the memory 1 is a binary signal output form the D flip-flop 13.

The comparator 341 compares the voltage charged by the capacitor 339 through the peak hold circuit 323 during reading of the shading distortion data, i.e., the voltage at a connecting point 341b with an output (L) from the image sensor 407.

The comparator 341 therefore can detect variations in output from the image sensor 407 with respect to the charge voltage of the capacitor 339. The charge voltage of the capacitor 339 is changed with a change in output from the image sensor 407 (this operation will be described later). It is determined by the comparison operation of the comparator 341 whether the present output of the image sensor varies with respect to the immediately preceding pixel output. Therefore, nonuniformity of the image sensor 407 outputs caused by shading distortion can be detected.

A waveform of a signal on the output signal line 341a of the comparator 341 is set at high level when the level of the output from the image sensor 407 is lower than the level of the output from the charge/discharge circuit.

In the measurement of shading distortion data, the switching signal (F) is set at low level, and data (H) on the signal line 341a is latched by the D flip-flop 13 in synchronism with the latch signal (K).

When the voltage at the image sensor 407 is higher than that at the connecting point 341b, an output from the D flip-flop 13 is set at a low level in synchronism with the latch signal (K). Therefore, the analog switch 335 is connected to the signal line 323, and the capacitor 339 held at the peak value by the peak hold circuit 323 is charged through the resistor 337. As a result, the voltage at the connecting point 341b is increased.

When the voltage at the image sensor 407 is lower than that at the connecting point 341b, the operation is performed in the reverse order. The analog switch 335 is switched to the ground side. The capacitor 339 is discharged through the resistor 337, and the voltage at the connecting point 341b is decreased.

In this manner, the capacitor 339 is charged or discharged in response to the output from the comparator 341. Therefore, the charge voltage of the capacitor 339 follows the output from the image sensor 407.

In the above operation, a waveform corresponding to the output from the image sensor 407 appears at the connecting point 341b. During the above operation, the output data from the D flip-flop 13 is stored in the one-line memory 1 in units of pixels.

A one-line output from the D flip-flop 13 is stored in the memory 1 as data of change points which approximately represent changes in outputs from the image sensor 407 which reads the white reference surface 408.

During storage of shading correction data, the switching signal (F) is set at low level, as shown in FIG. 12. The correction data (H) output from the shading correction processing unit 17 is input to the D flip-flop 13 through the AND gate 15 and the OR gate 16. The input data is then latched in response to the latch signal (K). The Q output from the D flip-flop 13 is written in the memory 1 through the tristate buffer 3 in response to the write signal (E). At this time, The address signal (D) for the memory 1 is incremented in increments of two, i.e., . . . k+1, k+3, k+5, . . . (k is an even integer) with respect to one bit of the shading correction data. For this reason, the correction data are sequentially written at odd addresses in the memory 1.

When the one-scanning data is written, the order of the even and odd numbers of the address signal (D) for the memory 1 is reversed (i.e., an order of 0, 1, 2, 3, 4, . . . is reversed to an order of 1, 0, 3, 2, 5, 4, . . . ). In addition, the signal (F) is set at a high level. The correction data read out from a memory area at the odd addresses of the memory 1 are input to the D flip-flop 13 through the AND gate 14 and the OR gate 16, and are latched in response to the latch signal (K). The latched data are written at addresses . . . k+2, k+4, k+6, . . . in the memory 1 in the same manner as in the immediately preceding line. The identical correction data are stored at the even and odd addresses of the memory 1. Therefore, the operation for storing the shading correction data is completed.

In order to perform shading distortion correction of the image signal obtained by reading the original image, the switching signal (F) is set at a high level, and the output signal from the memory 1 is supplied to the D flip-flop 13. The read address signal (D) is output in correspondence with the read position of the image sensor 407. As a result, the analog switch 335 is switched in the same pattern as in reading of the shading distortion data in accordance with the data read out from the memory 1, and the capacitor 339 is charged or discharged. At this time, the output (323a) from the peak hold circuit 323 is changed in accordance with a change in density of the white (background) portion of the original. In the white portion, the voltage at the connecting point 341b is changed in the same manner as in scanning of the white reference surface 408. That is, a the voltage waveform similar to that of the read output representing the white reference surface 408 appears at the connecting point 341b.

A change in voltage at the connecting point 341b in correspondence with the shading distortion data is supplied to the A/D converter 19 through the voltage-dividing resistors 343 and 345, and the A/D conversion reference value is changed.

The A/D conversion reference value used for A/D-converting the read output of the original image from the image sensor 407 is changed to a value corresponding to shading distortion. Therefore, image data correction corresponding to shading distortion is performed. A digital image signal free from shading distortion can be output from the A/D converter 19.

Figure 1:
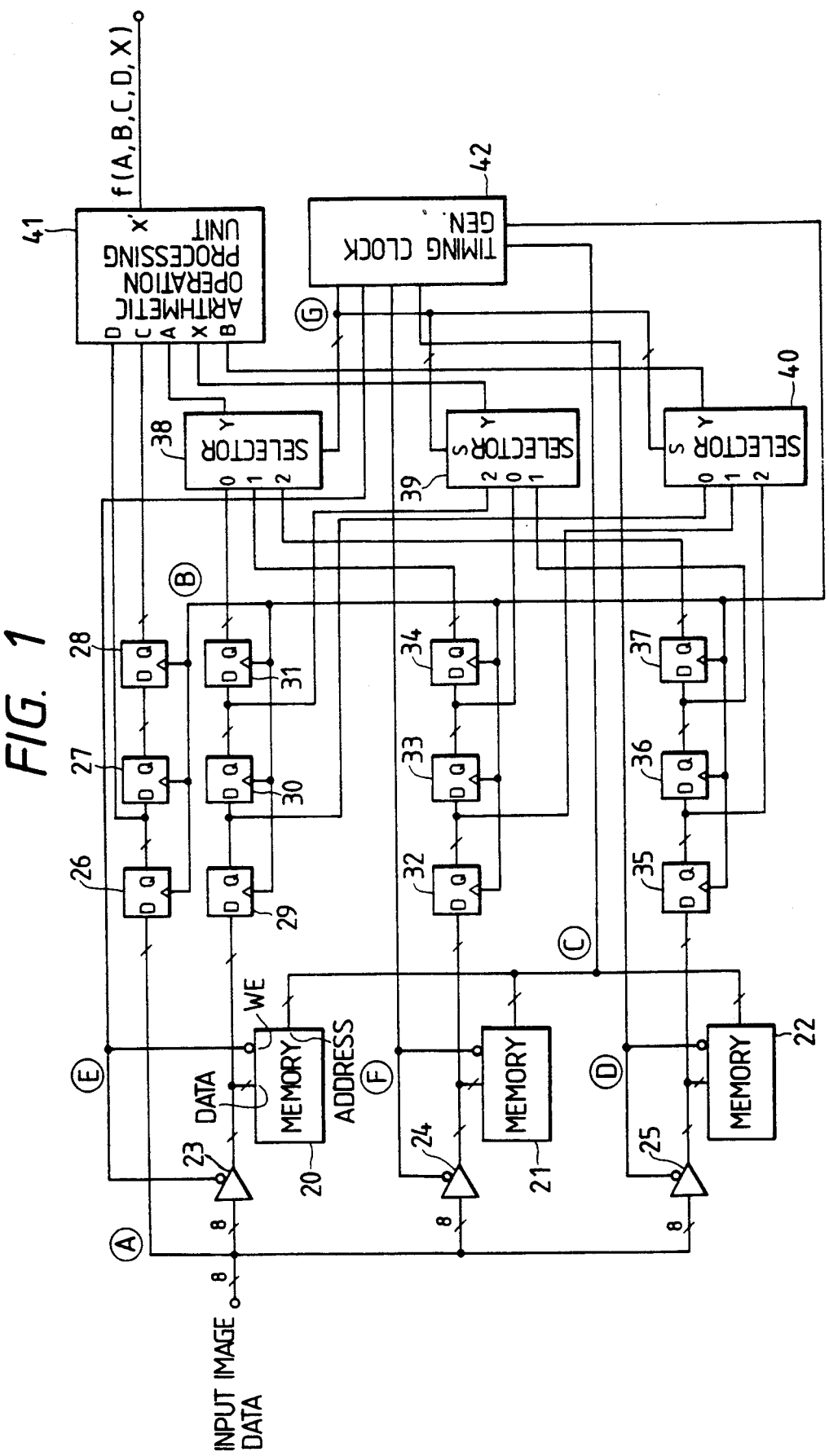
FIG. 1 is a block diagram of a conventional image processing circuit.
Figure 2:
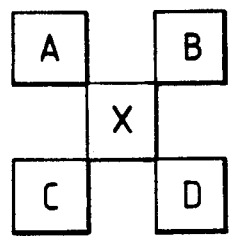
FIG. 2 is a view showing an image processing matrix.

An operation for reading the original image will be exemplified as image processing by matrix calculations shown in FIG. 2.

Input 2-line (nth and (n+1)th lines) image data are stored in the memory 1. The image data of the nth and (n+1)th lines are read out at the time of input of the (n+2)th line image data and are subjected to a matrix calculation in the arithmetic operation processing unit 4. The matrix calculations include edge emphasis, smoothing, and image discrimination.

Two address signals corresponding to one pixel of the input image data are output from the timing clock generator 18. The timing clock generator 18 also outputs an address signal incremented in unitary increments in an order of k, k+1, k+2, ... and an address signal in an order of k, k-1, k+2, k+1, ... obtained by alternately changing the even and odd numbers.

Figure 13:
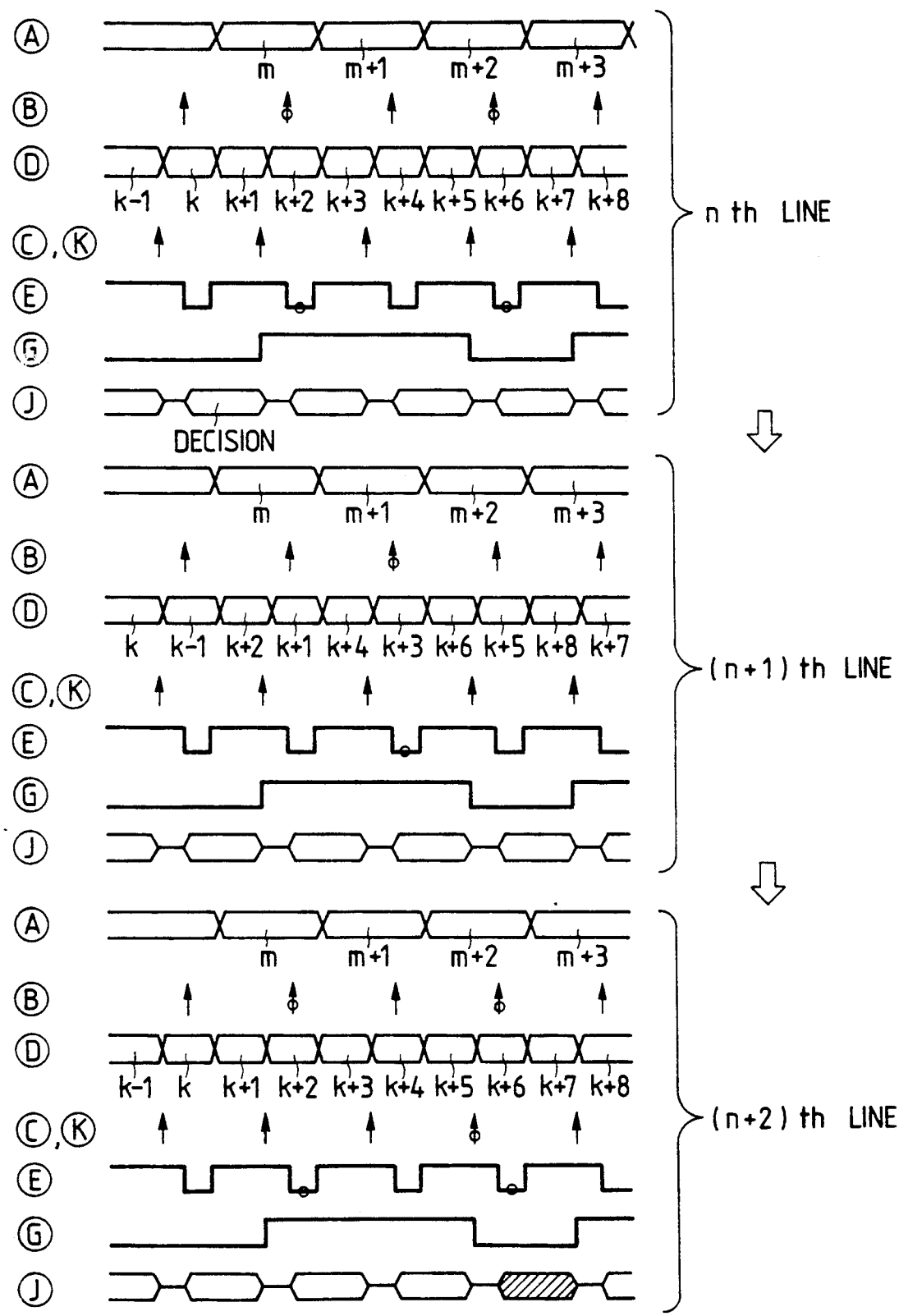
FIG. 13 is a timing chart of an image processing operation.

As shown in FIG. 13, an address signal (D) sequentially incremented in increments of two in accordance with the nth line image data input is supplied to the memory 1. The timing clock generator 18 outputs signals of addresses k+1 and k+2 in correspondence with the image data of the mth pixel, signals of addresses k+3 and k+4 in correspondence with the image data of the (m+1)th pixel, and signals of addresses k+5 and k+6 in correspondence with the image data of the (m+2)th pixel. The timing clock generator 18 sets the write signal (E) at a low level when the address signals (D) represent the addresses k+2, k+4, k+6, ... Therefore, the image data of the mth, (m+1)th and (m+2)th pixels of the nth line are stored at addresses k+2, k+4, and k+6 in the memory 1.

When the image data of the (n+1)th line is input, the address signal (D) representing the reversed of the even and odd addresses is supplied to the memory 1. That is, the timing clock generator 18 outputs signals of addresses k+2 and k+1 in correspondence with the image data of the mth pixel, signals of addresses k+4 and k+3 in correspondence with the image data of the (m+1)th pixel, and signals of addresses k+6 and k+5 in correspondence with the image data of the (m+2)th pixel. The timing clock generator 18 sets the write signal (E) at low level when the address signal (D) rerepresents the addresses k+1, k+3, k+5, ..., thereby sequentially storing the image data of the mth, (m+1)th, and (m+2)th pixels of the (n+1)th line at the addresses k+1, k+3, and k+5 of the memory 1.

The image data of the nth line are stored at the addresses k, k+2, k+4, k+6, ... and the image data of the (n+1)th line are stored at the addresses k+1, k+3, k+5, k+7, ... in the memory 1, respectively.

When the image data of the (n+2)th line is input, the same address data as in the nth line is supplied to the memory 1 as the address signal (D).

Assume that the line including the pixels C and D in FIG. 2 is the (n+2)th line. The address signals (D) are incremented in increments in two, e.g., k, k+1, k+2, every pixel. The image data (A) currently input as the image data of the pixels C and D are sampled by the D flip-flops 5 and 7 in response to the pixel clocks (B). The sampled data are input to the inputs D and C of the arithmetic operation processing unit 4. Assume that pixel positions of the pixels C and D in the main scanning direction are defined as m and m+2, respectively. The image data of the (n+2)th line are stored at the addresses ... k, k+2, k+4, k+6, ... in the memory 1. The image data of the nth line are stored at the addresses ... k, k+2, k+4, k+6, ..., as described above. However, as shown in FIG. 13, the nth line data read out from a memory area at an address represented by a given address signal during a high level of the write signal (E) is latched by the D flip-flop 10 in response to the latch signal (B). Thereafter, the address is not updated and the write signal (E) is set at a low level, so that the (n+2)th line data can be stored at the same address. Therefore, after the data stored in the memory 1 is properly read out, the new data is stored at the address from which the previous data is read out.

Assume that the data of the pixel X when the data corresponding to the pixels C and D are latched by the D flip-flops 5 and 7. The data of the pixel X is read out from the memory 1 when the address data represents the address k+3, and latched by the D flip-flop 9 in response to the pixel clock (C). This data is obtained by storing the (m+1) pixel data stored at the address k+3 of the memory 1 in response to the write clock (E), when the image data of the (n+1)th line is input, as previously described. The data from the D flip-flop 9 is input to the input X of the arithmetic operation processing unit 4. On the (n+1)th line, the address signal (D) is given to the memory 1 such that the even and odd addresses are reversed, i.e., k, k-1, k+2, k+1, k+4, ...

Data of the pixels A and B are taken into consideration. These data are latched by the D flip-flops 10 and 12 and read out from the memory 1 in response to the pixel clocks (B) in accordance with the address signals representing the addresses k+2 and k+6. These data are obtained by writing the mth and (m+2)th pixel data at the addresses k+2 and k+6 in the memory 1 in response to the write clocks (E) on the nth line, as previously described. The data from the latches 10 and are supplied to inputs B and A of the arithmetic operation processing unit 4. The address signal (D), on the nth line is incremented in the same manner as on the (n+2)th line. By the above operations, the address signals Ⓓ corresponding to the (n+2)th line image data are supplied to the memory 1, and the already stored image data of the nth and (n+1)th lines are read out. At the same time, the image data of the (n+2)th line is stored.

The image data of the matrix shown in FIG. 2 are supplied to the arithmetic operation processing unit 4. The data f(A,B,C,D,X) output from the arithmetic operation processing unit 4 appears at an output terminal Ⓙ (the ⬚ portion in FIG. 13).

The above operations are repeated to perform the arithmetic processing of all images.

Shading correction data of the pixel G is considered. The data are alternately read out from a memory area at the even and odd addresses of the memory 1. As described above, the identical data are written at the even and odd addresses during storage of the shading correction data, and the data read out from a memory area at the even (odd) addresses are written at the odd (even) addresses during reading of the original image. The identical data of every line are output in correspondence with the image data at the identical pixel positions.

As shown in FIG. 13, according to the present invention, the address signals represent addresses $k+1$, $k+2$, $k+3$, $k+4$, ... for the nth line, and addresses $k+2$, $k+1$, $k+4$, $k+3$, ... for the (n+1)th line, and the even and odd addresses are reversed and accessed every line. However, reversing is not limited to the even and odd addresses. A predetermined number (integer) of addresses per pixel may be accessed to obtain the same effect as described above. The alternate access of the even and odd addresses in the above embodiment represents that the lowest address line of the memory address lines is inverted in each pixel. When the second address line is inverted in each pixel, the addresses for the nth line are changed to $2(j)$, $2(j+1)$, $2(j)+1$, $2(j+1)+1$, $2(j+2)$, $2(j+3)$, and the addresses for the (n+1)th line are changed to $2(j+1)$, $2(j)$, $2(j+1)+1$, $2(j)+1$, $2(j+3)$, $2(j+2)$. In this case, access of the same address every two lines is kept unchanged.

Figure 14:
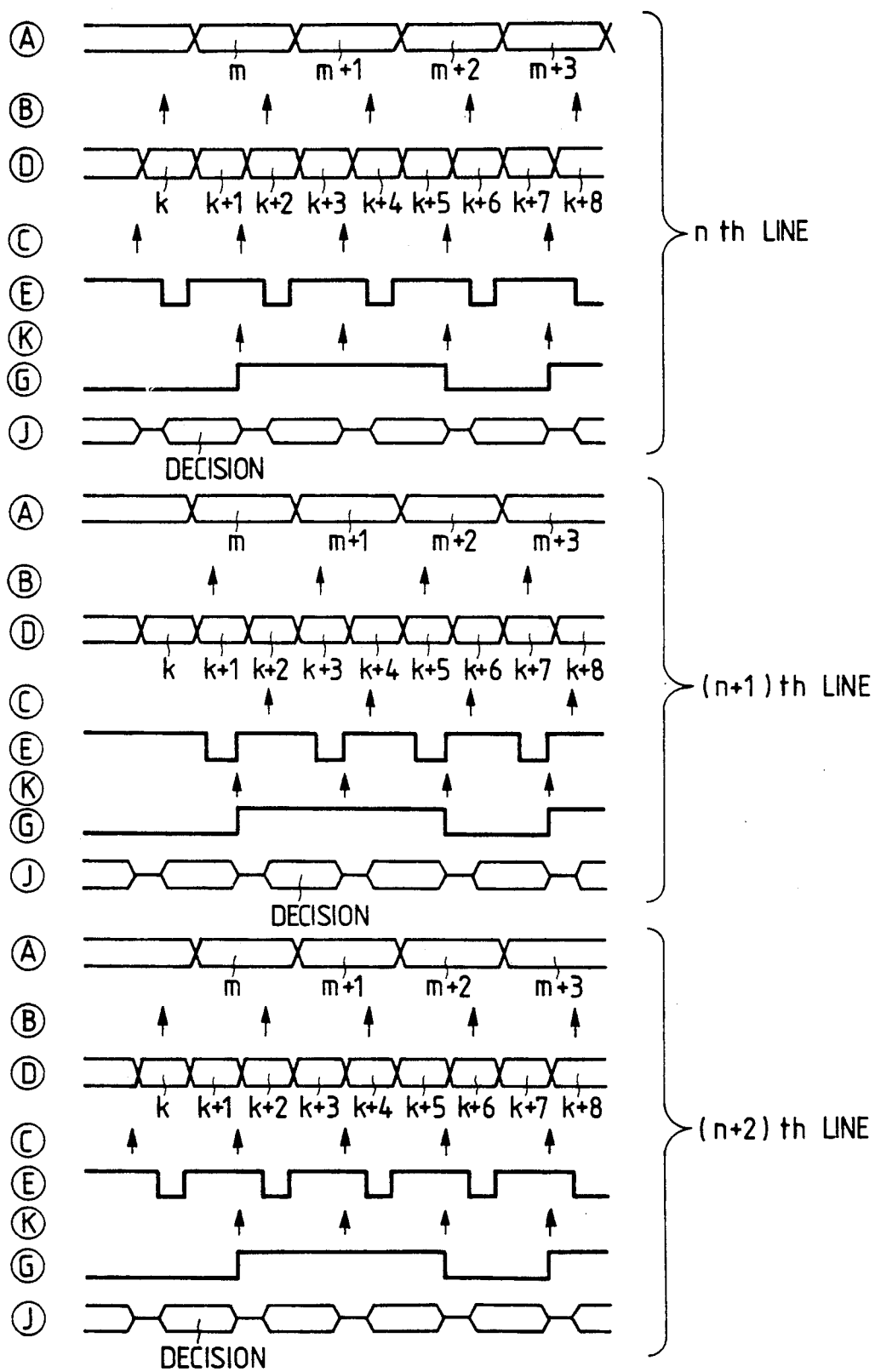
FIG. 14 is another timing chart of an image processing operation.

In this embodiment, the even and odd addresses for each pixel are alternately accessed every two lines. However, as shown in FIG. 14, the address signal Ⓓ may represent the same addresses every line, and the read/write timings of the memory 1 in response to the write clocks Ⓔ may be changed every line. The even and odd addresses are alternately accessed to obtain the same effect as described above.

The storage capacity of the memory 1 may be three or more lines, and the number of addresses corresponding to each pixel of the image data may be increased. In addition, when the number of flip-flops is changed, the present invention is also applicable to calculations of a larger matrix.

In the above embodiment, the correction data stored at the odd address in the first main scanning cycle is read out from a memory area at the odd address in the second main scanning cycle during storage of a shading waveform. Therefore, the identical data are stored at the even and odd addresses. However, the white reference surface 408 may be scanned twice by the image sensor 407, and the switching signal Ⓕ is set at low level in the second scanning cycle. The correction data from the image sensor 407 can be obtained from the shading correction processing unit in the second main scanning cycle in the same manner as in the first main scanning cycle. The resultant correction data is stored at the even address, thereby obtaining the same effect as in the above embodiment.

The same addresses are accessed every line, and the read/write timings of the data are changed every line. The even and odd addresses are alternately accessed, and the correction data from a memory area at the same addresses are always accessed. In this case, only the correction data of one main scanning cycle are stored at the even addresses.

Even if image data to be stored for arithmetic processing is, e.g., one-line image data, the memory capacity can be selected in accordance with the volume of input data.

In the arrangement of the above embodiment, the memory IC can be effectively utilized to reduce cost, and the apparatus can be made compact at low cost with a simple circuit arrangement. The number of pins of a memory LSI can be reduced. The number of line memories can be reduced since the read/write access is performed at the identical addresses.

A conventional apparatus requires three 8×8 kbit memory ICs to perform 2,500 bit image processing at a resolution of 8 bits. However, the arrangement of this embodiment requires only one 8×8 kbit memory IC.

The correction data stored prior to reading of the original is stored at a plurality of addresses of one pixel, and therefore the correction data and the image data upon reading of the original can be stored in a single memory, thereby reducing the number of memories and cost and providing a compact apparatus.

The shading correction data prestored in the memory to store the correction data at the plurality of addresses of the memory are read out once and stored therein. Therefore, the image data and the shading correction processing data can be stored in a single memory. The number of memory ICs and hence cost can be reduced, and the apparatus can be made compact.

As described above, the pixel data of a given pixel position are stored at given addresses of the image memory, while new pixel data of the given pixel position are stored at the given addresses of the image memory. Therefore, a memory for storing the new image data need not be additionally arranged. Therefore, read access of the old image data can be simultaneously performed with the write access of the new image data.

The plurality of addresses correspond to each pixel, and the image data of the identical pixel positions on the different lines can be written in correspondence with the plurality of addresses. Therefore, a single memory can be used as a line memory for a plurality of lines of image data, thereby achieving highly efficient processing.

Since the image data and the correction data can be stored in a single memory, an increase in the number of memories can be prevented. Since the correction data and the image data are stored in the same addresses to correspond to each other, the correction data and the image data need not be independently accessed, thus simplifying the processing.

Figure 15:
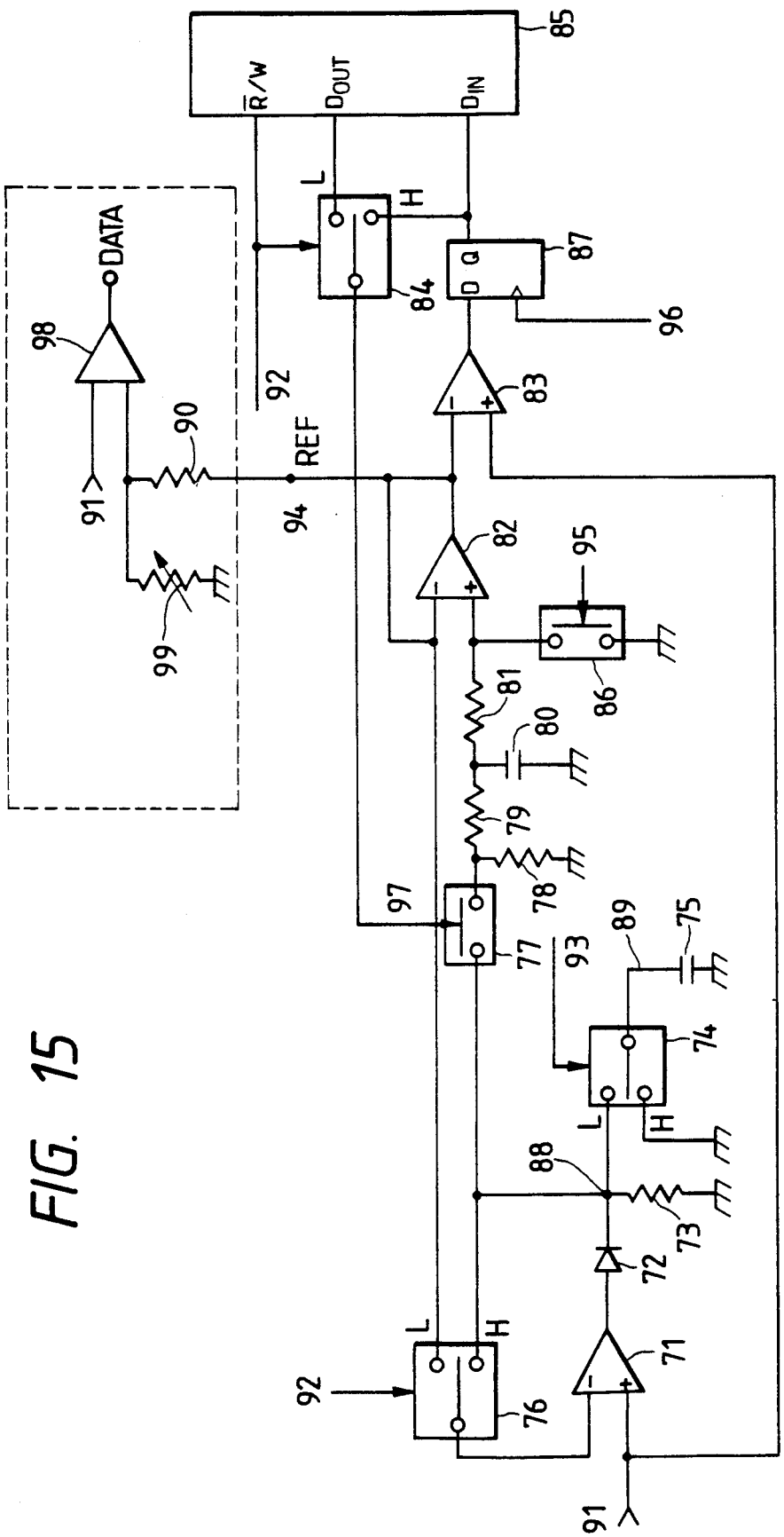
FIG. 15 is a block diagram showing an arrangement of a shading correction circuit which employs the present invention.

FIG. 15 shows another circuit arrangement of the shading correction processing unit 17.

The shading correction processing unit 17 includes voltage comparators 71 and 83 each of which outputs a signal having a high level when the "+" input voltage is higher than the "−" input voltage and otherwise outputs a signal of a low level, an OP (operational) amplifier 82, a diode 72, capacitors 75 and 80, and resistors 73, 78, 79, and 81. Switches 74, 76, and 84 are connected to the "H" contacts when a control signal (arrow) is set at H level and "L" contacts when a control signal is set at L level. Switches 77 and 86 are closed when a control signal (arrow) is set at H level and are opened when the control signal is set at L level.

The shading correction processing unit 17 also includes a semiconductor memory RAM 85 for storing a signal to a terminal Din when a $\overline{R}$/W signal is set at H level and outputting the data to a terminal Dout when the $\overline{R}$/W signal is set at low level, and a flip-flop 96 for latching an input signal at a leading edge of a pulse signal corresponding to each pixel and input to a terminal D.

An operation of the shading correction processing unit 17 shown in FIG. 17 will be described below.

In the original reading apparatus of this embodiment, in order to measure and store the shading correction data, light reflected by the white reference surface 408 having a uniform white color distribution is read by the image sensor 407 (pre-scanning).

Pre-scanning is performed as follows.

A video signal 91 obtained by causing the image sensor 407 such as a CCD sensor to read the white reference surface 408 is input to the comparator 71. The comparator 71 compares the "+" input voltage with the "−" input voltage and outputs a signal of high or low level. When the "+" input voltage is higher than the "−" input voltage, the comparator 71 outputs a signal of high level. When the switch 74 is connected to a contact L, the capacitor 75 is charged, and a potential at a connecting point 88 is increased. During pre-scanning, a signal 92 is set at a high level, and the switch 76 is connected to the H contact. A potential at the connecting point 88 is input to one input of the comparator 71. Therefore, when the potential at the connecting point 88 is continuously increased and becomes higher than the video signal 91 at the "+" input of the comparator 71, the output from the comparator 71 is set at low level. The capacitor 75 is discharged through the resistor 73. When a discharge time contact is sufficiently large, the potential at the connecting point 88 is increased to a maximum value of the video signal 91 and is kept at the maximum value. The above operation is a peak hold operation.

The video signal 91 is also input to the "+" input terminal of the comparator 83. As a control signal 95 for the switch 86 is set at high level at the beginning of unit line of the line sensor output, an "+" input to the OP amplifier 82 is set at ground level, and a "−" input of the comparator 83 is set at ground level. When the video signal 91 is input, the "+" input voltage at the comparator 83 becomes higher than the "−" input voltage thereto. Therefore, the comparator 83 outputs a signal of high level which is latched by the flip-flop 87. A latch signal 96 is a pulse signal having a predetermined interval corresponding to each pixel and is synchronized with an address signal to the RAM 85. Since the signal 92 is set at a high level, a latched output from the flip-flop 87 is written in the RAM 85 and serves as a control signal 97 for the switch 77 through the switch 84 connected to the H contact by the H level signal 92.

When the signal 97 is set at a high level, the switch 77 is turned on. The potential at the connecting point 88 peak-held by the capacitor 75 is charged by the capacitor 80. An output from the amplifier 82, i.e., a potential at the "−" input terminal of the comparator 83 is increased. When the capacitor 80 is kept charged and the "−" input voltage of the comparator 83 becomes higher than the level of the video signal, the output from the comparator 83 is set at low level. The latched output from the flip-flop 87 is set at low level. The switch 77 is turned off, and the capacitor 80 is discharged through the resistors 79 and 78. The potential at an output terminal 94 is decreased. The above operations are repeated, and therefore, a waveform substantially the same as that of the video signal 91 appears at the output terminal 94.

The RAM 85 stores a one-line output from the flip-flop 87, i.e., a one-line output from the beginning to the end of unit line.

The pre-scanning operations are thus ended.

The signal 92 is set at a low level during image reading.

When a video signal 91 obtained by causing the image sensor 407 to read the original image is input, a peak value is held by the capacitor 75, as described above. The potential at the connecting point 88 is input to the switch 77. Since the signal 92 is set at low level, the RAM 85 is set in the read mode. Since the switch 84 is connected to the contact L, the switch 77 repeats ON/OFF operations in accordance with the data 97 stored during pre-scanning and read out from the RAM 85. In this case, a given position of the video signal on unit line corresponds to the same address in both the read and write modes. The capacitor 80 is charged and discharged on the basis of the potential at the connecting point 88 upon ON and OFF operations of the switch 77. A waveform similar to that obtained by pre-scanning and reading the white reference surface 408 appears at the terminal 94.

The waveform appearing at the terminal 94 is input to the "−" input of the comparator 71 through the switch 76. That is, the capacitor 75 peak-holds the peak value of the shading-corrected waveform.

A voltage obtained at the terminal 94 is used as a reference value (REF) of the A/D converter 19 shown in FIG. 10, thereby obtaining the shading-corrected digital image data. The voltage at the terminal 94 may be used as a threshold value, and the video signal 91 may be quantized to obtain shading-corrected binary data DATA. As indicated by a dotted area of FIG. 15, the REF signal is voltage-divided by resistors 90 and 99, and a voltage-divided signal is used as a threshold level and compared with the video signal 91 by a comparator 98, thereby binarizing the video signal 91. In order to perform shading correction, a gain of a gain amplifier for amplifying the video signal may be controlled by an output appearing at the terminal 94 in addition to a scheme for controlling the binarizing threshold level or a reference level for A/D conversion of the video signal by using the output appearing at the terminal 94.

The peak hold operation during reading of the original image will be described below.

Figure 24:
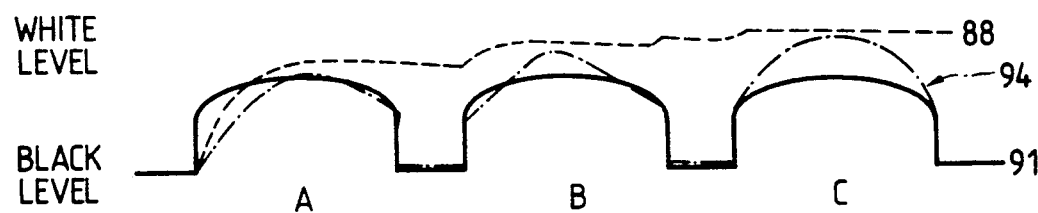
FIG. 24 is a timing chart for explaining a peak hold operation during reading of an original.

Assume that an image signal waveform 91 in FIG. 24 is input as that of the video signal 91. The capacitor 75 is charged, and a potential at the connecting point 88 is increased. Shading-corrected data with respect to the potential at the connecting point 88 appears at the terminal 94. An output from the terminal 94 is input to the "−" input of the comparator 71. When the output from the terminal 94 is lower than that of the video signal 91, the comparator 71 outputs a signal of high level, and the capacitor 75 is kept charged. Therefore, the peak value is kept increased. The level of the shading-corrected waveform 94 is increased accordingly. The capacitor 75 is kept charged until the level of the shading-corrected waveform becomes lower than that of the video signal 91. Shading correction is performed with the resultant peak value. Therefore, each final waveform C shown in FIG. 24 is obtained.

As described above, the reference inputs to the peak hold comparator 71 are switched between pre-scanning and image reading. Even if the level of the image signal is reduced, an accurate reference value can be obtained and therefore optimal image data can be obtained.

Figure 16:
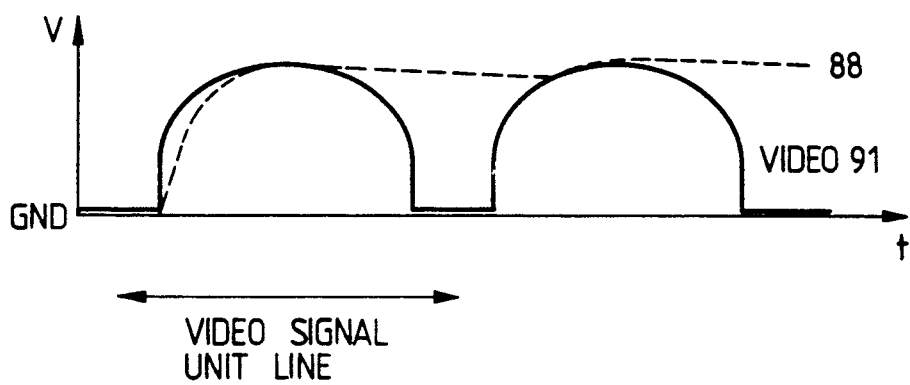
FIG. 16 is a timing chart showing a peak hold operation.

FIG. 16 shows a waveform of the video signal 91 to be peak-held and a waveform at the connecting point 88. The waveform (solid line) of the video signal 91 is obtained upon reading of the white reference surface 408. Even if the white reference surface having a uniform white color distribution for shading correction is read, potentials at both ends of each line are decreased and the waveform becomes an inverted U-shaped waveform. A dotted line represents the waveform at the connecting point 88. The voltage is increased to the highest portion of the video signal 91 upon charging of the capacitor 75. When the voltage of the video signal is decreased, the capacitor 75 is discharged and the potential is decreased. However, when a discharge time constant is set to be large, the next peak appears before the potential is decreased, thereby retaining the peak value.

Figure 17:
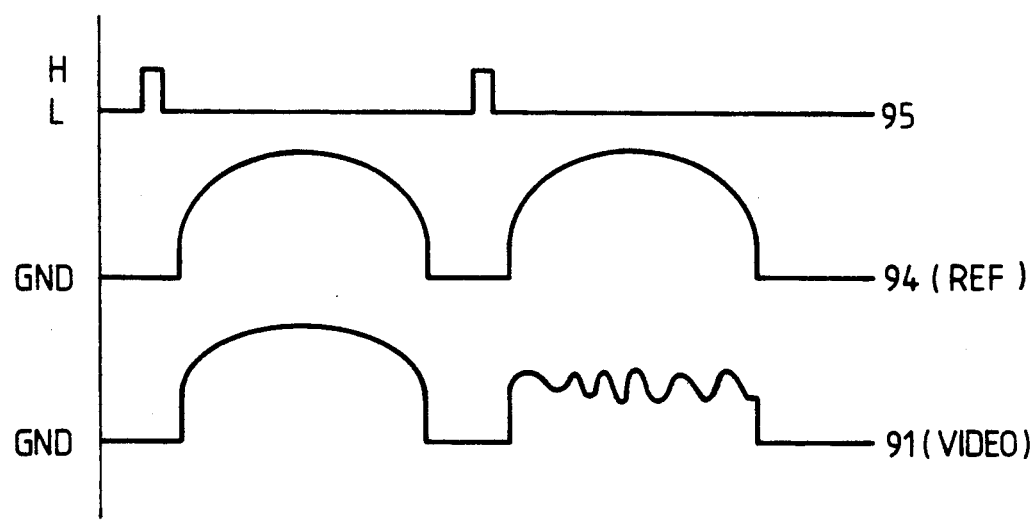
FIG. 17 is a timing chart showing an original image reading operation.

FIG. 17 shows waveforms obtained when an image is actually read. The signal 95 is a line sync signal which is set at high level at the start of each line. The waveform 94 is a waveform obtained by shading-correcting the peak level with the data read out from the RAM 85. When the video signal is the highest white signal (the first line), the waveform 94 almost coincides with that of the video signal 91. The maximum value of the video signal 91 is decreased on the second line. However, the waveform 94 (REF) is kept unchanged since the shading-corrected waveform peak value of the immediately preceding line is kept held.

Figure 18:
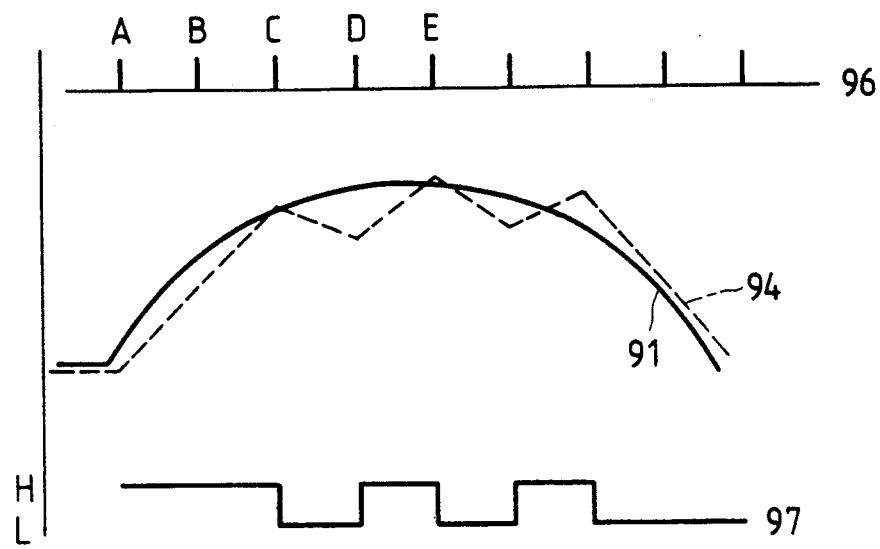
FIG. 18 is a timing chart showing an operation for measuring shading correction data.

FIG. 18 shows an operation for measuring shading correction data in pre-scanning. A solid waveform is the video signal 91, and a dotted waveform is the REF output 94. The latch pulse signal from the flip-flop 87 is represented by reference numeral 96. The control signal for the switch 77 is represented by reference numeral 97.

A pre-scanning operation will be described below. Since the video signal 91 is higher than the REF output 94 at time A, the output (=97) from the comparator 83 is set at a high level, and the switch 77 is turned on. The capacitor 80 is then charged to increase the REF output 94. The REF output 94 is kept increased at time B. Since the REF output 94 is higher than the video signal 91 at a time C, the output 97 is set at low level, and the switch 77 is turned off. The capacitor 80 is discharged, and the REF output 94 is decreased. Similarly, the waveform of the REF output 94 can follow changes in video signal 91 upon charging/discharging of the capacitor 80 in response to ON/OFF operations of the switch 77. In this case, the data 97 is written in the memory and the switch 77 is ON/OFF controlled by the read data during image reading, thereby reproducing the REF waveform during pre-scanning.

The control signal 93 is set at a high level to connect the capacitor 75 to ground and discharge the capacitor 75 prior to pre-scanning. During pre-scanning, the potential of the capacitor 75 is always increased from the ground level, and an accurate peak level can be obtained. As a result, accurate shading correction can be performed.

Figure 19:
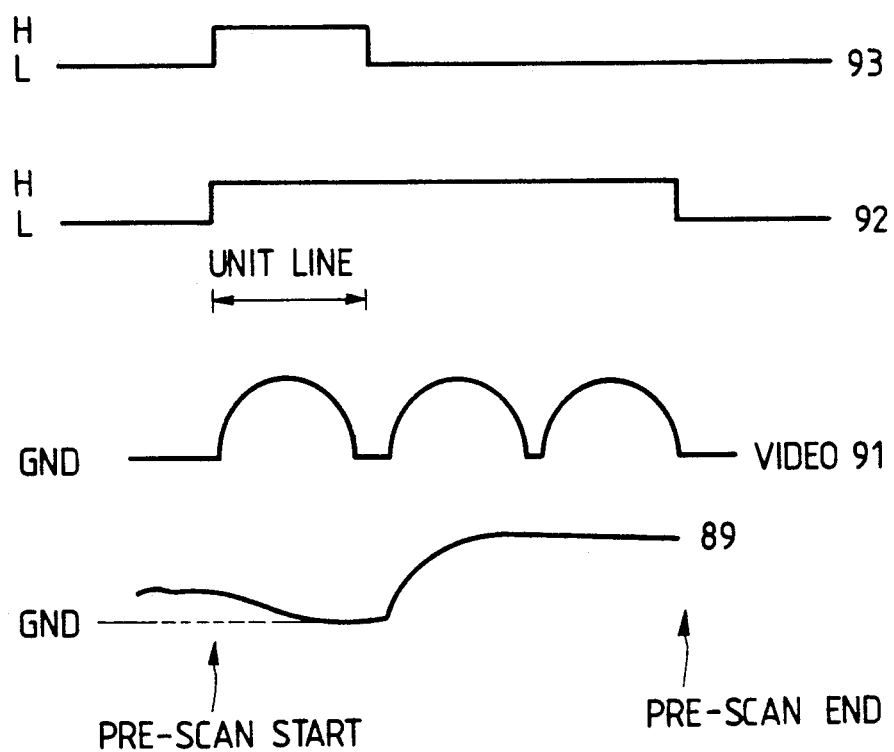
FIG. 19 is a timing chart showing waveforms during pre-scanning.

FIG. 19 shows waveforms during pre-scanning. The potential 89 at the capacitor 75 prior to pre-scanning is unstable. When pre-scanning is started and the signal 93 is set at high level, the capacitor 75 is discharged and its potential reaches the ground level. When a period (i.e., the period of unit line) required for sufficiently discharging the capacitor 75 has elapsed, the signal 93 is set at a low level. In this case, the capacitor 75 is connected to the connecting point 88 and is charged. Therefore, the peak hold operation is started. The signal 92 is set at a high level during only pre-scanning (to be described later).

Figure 20:
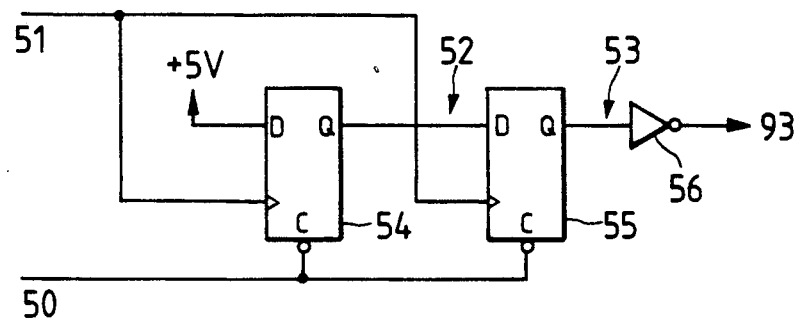
FIG. 20 is a block diagram showing an arrangement of a reset signal generator.
Figure 21:
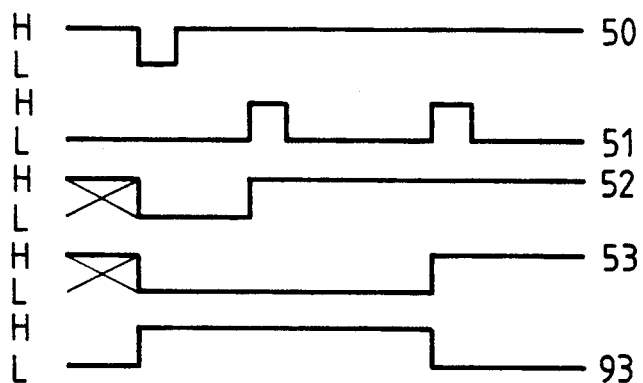
FIG. 21 is a timing chart showing an operation for generating a reset signal.

A circuit for generating the signal 93 is shown in FIG. 20. This circuit includes D flip-flops 54 and 55 each for latching a signal input to the D terminal in response to the leading end of a signal 51 and generating a Q output. The D flip-flops 54 and 55 are cleared in response to signals input to their C terminals. When the C signal is set at a low level, the Q outputs go low. Assume that a signal 50 as a pulse is input as a pre-scan start signal, as shown in FIG. 21. A one-shot pulse per unit line (this pulse may be the same as the signal 95 in FIG. 15) is input as the signal 51. When the signal 50 is set at a low level, the flip-flops 54 and 55 are cleared, and the signal 52 is set at a high level in response to the first pulse of the signal 51. The signal 53 is set at a high level in response to the second pulse of the signal 51. Therefore, the signal 93 is kept at a high level for unit line or more from the pre-scan start signal.

The circuit shown in FIG. 20 is an example. Any other circuit arrangement may be employs if it outputs the control signal 93 for a predetermined period of time upon the start of pre-scanning. The clearing period can be arbitrarily set in accordance with the discharge time constant of the capacitor. The clearing period is not limited to the unit line period defined in this embodiment.

In this manner, the peak value hold capacitor 75 is discharged in order to perform pre-scanning for measuring shading distortion. Thereafter, the measurement of shading distortion is performed. Therefore, the measurement of shading distortion can also be accurately measured, and excellent shading correction can be performed.

Figure 22:
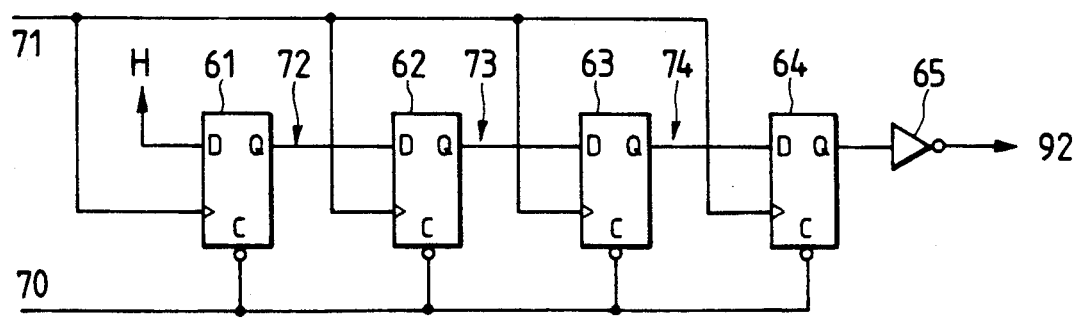
FIG. 22 is a block diagram showing an arrangement of a pre-scan signal generator.

FIG. 22 shows a circuit arrangement for generating the signal 92. The circuit includes D flip-flops 61 to 64. When the C terminals of the D flip-flops 61 to 64 are set at low level, Q outputs therefrom are set at low level. Otherwise, the D signals are latched in response to a trigger signal (▷) and are output at the Q terminals. The circuit in FIG. 22 also includes an inverter 65.

An output 92 from the inverter 65 is supplied to the RAM 85 and the switches 76 and 84 and serves as a control signal for the switches 76 and 84 and a read-/write signal for the RAM 85.

Figure 23:
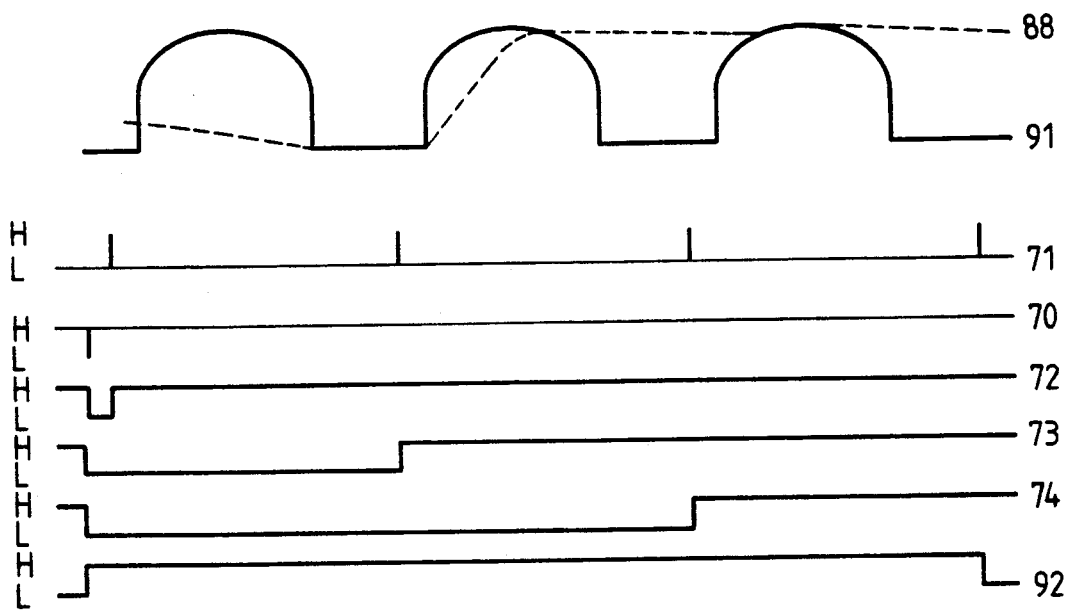
FIG. 23 is a timing chart showing an operation for generating a pre-scan signal.

FIG. 23 shows waveforms during pre-scanning. A video waveform 91 is obtained by reading the white reference surface 408. Even if the white reference surface having a uniform white color distribution is read, potentials at both ends of unit line are decreased due to shading distortion, and the waveform becomes an inverted U-shaped waveform. A peak hold potential 88 does not reach the peak value of the video signal from the start of pre-scanning (i.e., at the moment when the signal 70 goes low) to the first line. The peak hold potential 88 becomes stable from the third line.

When the pre-scan start signal 70 is set at low level, the D flip-flops 61 to 64 shown in FIG. 22 are cleared, and their Q outputs are set at low level. A pulse 71 is set at high level at the beginning of unit line of the line sensor output and may be the signal 95 as described above. The D flip-flops 61 to 64 sequentially go high in response to the leading end of the signal 71. Outputs from the respective flip-flops are given as outputs 72 to 74 shown in FIG. 23. The signal 92 as the final output is set at high level within three or more lines from the pre-scan start signal, as shown in FIG. 23. During the high level of the signal 92, the RAM 85 is set in the write mode. The RAM 85 is addressed from 0 from the beginning of unit line. Even if wrong data is written on the second line, correct data can be written on the third line. Therefore, accurate shading correction data can be stored in the RAM 85.

In the above embodiment, the data from the start of pre-scanning to the third line are stored in the RAM 85 as the correction data. However, the number of correction data is determined by a charge/discharge time constant defined by the capacitor 75 and the resistor 73, but is not limited to a specific value. For example, when the data of the fourth line is stored in the RAM, an additional D flip-flop is connected to the output of the flip-flop 64. The circuit arrangement can be arbitrarily changed in accordance with a given time constant.

As described above, a timer is constituted by a counter, and the write time of the shading correction data is set, thereby obtaining shading correction data when the peak value is stabilized.

The time can be advantageously changed in accordance with the magnitude of the charge/discharge time constant.

In this embodiment, the counter is constituted by the D flip-flops and is used as a timer. However, the timer may be arbitrarily arranged if the write signal 92 for the memory is generated when a predetermined period of time has elapsed upon start of the peak hold operation. For example, a soft timer may be used. The data of the RAM 85 need not be sequentially corrected. The write signal 92 to the RAM 85 for the third line in FIG. 23 may be set at high level (provided that the control of the switch 76 is independently performed).

In this embodiment, pre-scanning is started after the peak hold value is stabilized. In this case, any algorithm may be utilized to detect a stable state, and storage may be started.

Another arrangement for measuring stable shading distortion data will be described below.

In the above embodiment, pre-scanning is performed after the pre-scan start pulse is input from a system and the signal 92 is set at a high level for only a predetermined period of time. In order to inhibit to start pre-scanning until the potential of the capacitor 75 is stabilized, a circuit shown in FIG. 25 may be used in place of that in FIG. 22.

Figure 25:
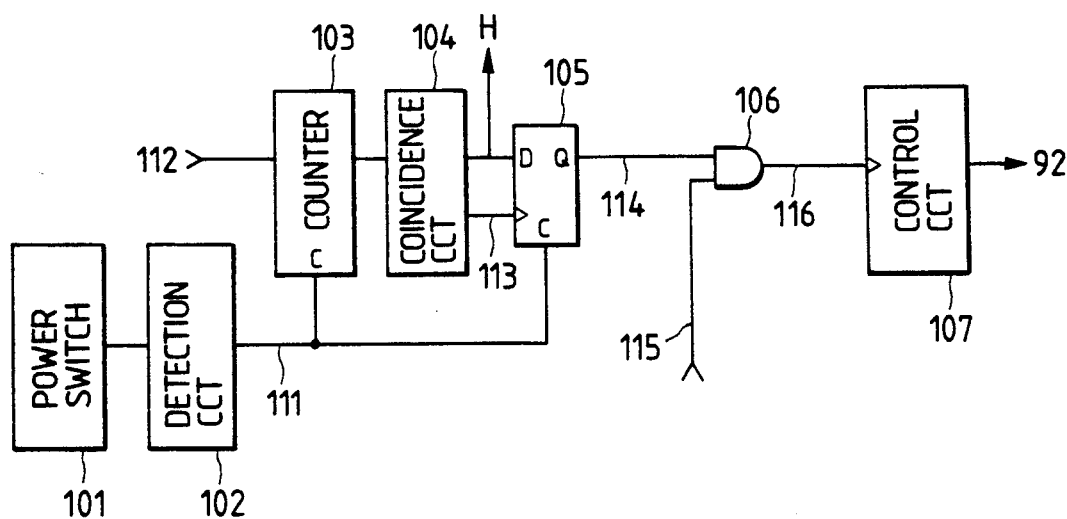
FIG. 25 is a block diagram showing another arrangement of a pre-scan signal generator.

The circuit shown in FIG. 25 includes a power switch 101, a detection circuit 102 for detecting an ON state of the power switch 101, a counter 103, a coincidence circuit 104, a D flip-flop 105, an AND gate 106, and a control circuit 107 for outputting a pre-scan signal 22.

When the power switch 101 is turned on, the detection circuit 102 detects the ON state of the power switch 101. A pulse signal 111 from the detection circuit 102 clears the counter 103. Clock pulses 112 which are generated at a predetermined period are counted by the counter 103 upon the ON operation of the power switch 101. The coincidence circuit 104 outputs a pulse signal 113 when an output from the counter 103 reaches a preset value. The D flip-flop 105 is cleared by the pulse signal 111 and outputs a signal of a low level. The flip-flop 105 latches a signal of a high level input to the D terminal at the leading edge of the pulse signal 113 and outputs the latched signal to the Q output. When a Q output 114 from the flip-flop 105 is input to the AND gate 106, the output is kept at a low level during a low level of the output 114 even if the pre-scan start pulse 115 is input. The control circuit 107 does not start pre-scanning since a signal 22 is kept low.

When the Q output 114 from the flip-flop 105 goes high in response to the coincidence signal 113, the start pulse 115 is directly output. The control circuit 107 outputs a signal of a high level for a predetermined period of time in response to the pre-scan start pulse 115, thereby performing pre-scanning.

Figure 26:
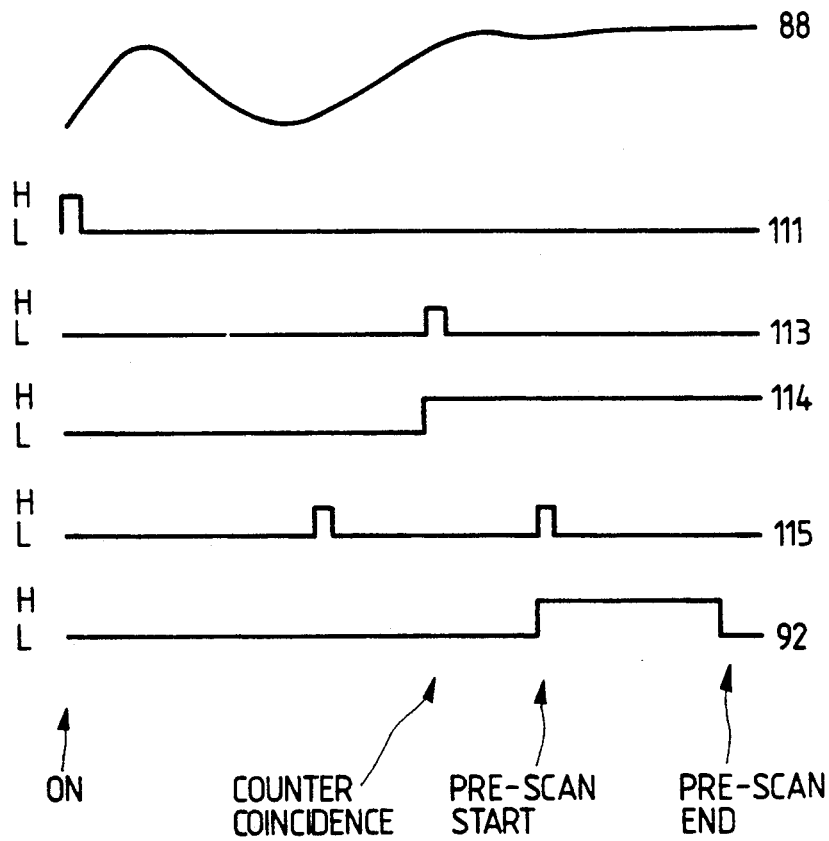
FIGS. 26 and 27 are timing charts for explaining an operation for generating a pre-scan signal.

Waveforms of the signals generated in the above operations are shown in FIG. 26. A potential 88 of the capacitor 88 is unstable immediately after the ON state of the power switch 101. As described above, until the count of the counter 103 coincides with the preset value, even if the pre-scan start signal is input, pre-scanning is not started. After a coincidence is established, pre-scanning is started.

FIG. 25 shows a hardware arrangement using the counter and the coincidence circuit. A pre-scan operation may be received by software for the predetermined period of time upon the ON operation of the power switch 101 under the control of a CPU.

The clock frequency of the counter and the count of the counter are determined by a charge/discharge time constant of the capacitor and are not limited to specific values.

As described above, the timer is arranged to inhibit reception of the pre-scan request for the predetermined period of time upon the ON operation of the power switch 101, and erroneous shading correction can be prevented.

Figure 27:
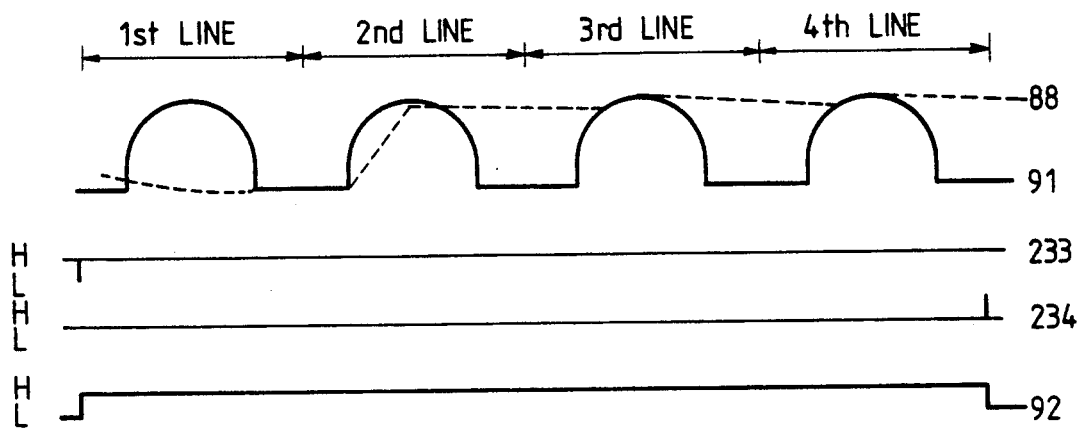

In the pre-scan operation, waveforms of the respective circuit components are shown in FIG. 27. A video waveform 91 is obtained by reading the white reference surface 408. Even if the white reference surface having a uniform white color distribution is read, potentials at both ends of unit line are decreased due to shading distortion, and an inverted U-shaped waveform is obtained. A peak hold potential 88 does not reach a peak value from the start of pre-scanning to the first line and is stabilized from the third line. For this reason, when shading correction data is obtained on the first or second line, correct values cannot be obtained.

In the following arrangement, an output 302 from the flip-flop 87 is compared with the data of the immediately preceding line. When the shading correction data of the present line coincides with that of the immediately preceding line, the peak signal is stabilized, and accurate correction data can be detected. Therefore, storage of data in the RAM 85 can be started.

Figure 28:
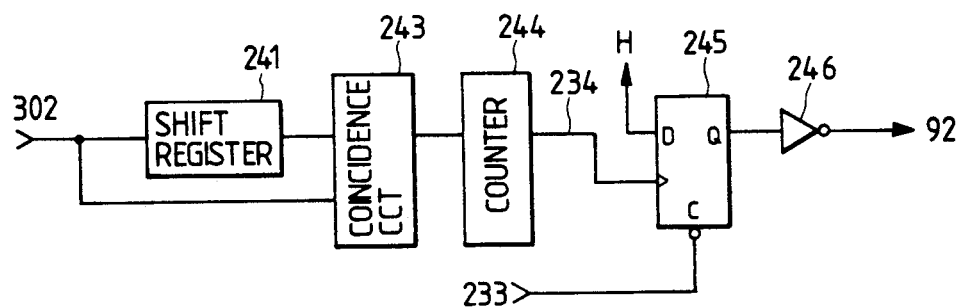
FIG. 28 is a block diagram showing another arrangement of a pre-scan signal generator.

More specifically, a circuit shown in FIG. 28 is used in place of the circuit of FIG. 22 as a circuit for generating the signal 92. Data delayed by unit line by a shift register 241 and the present data from the flip-flop 87 are input to a coincidence circuit 43. When a coincidence is established, the coincidence circuit 243 outputs a signal of high level. A counter 244 counts coincidence pulses. When a count of the counter 244 reaches a predetermined value, the counter 244 outputs a pulse signal 234. The counter 244 is cleared every unit line, and the pulse signal is output at the end of unit line. A D flip-flop 245 outputs a Q output of low level when it is cleared in response to the pre-scan start signal 233, and outputs a signal to the D terminal in response to the leading end of a trigger signal (▷). Therefore, the D flip-flop 233 outputs a signal of high level. This high level signal is inverted into a signal 92 by an inverter 246. The signal 92 serves as a write signal for the RAM 85. As shown in FIG. 27, until the pre-scanning is started and the data coincidence is detected, the RAM is set in the write mode. The address is started from 0 from the beginning of unit line, and therefore the data is updated every unit line. Finally, only the data upon detection of the coincidence are stored in the RAM. During reading of the data from the RAM, shading correction is performed.

The count of the coincidence should be equal to the number of all bits of unit line. However, the count may be appropriately selected since it is difficult to establish the coincidence for data of all bits even if the peak value is stabilized.

The storage operation is not completed until the shading correction data of the current line coincide with that of the previous line. The shading correction data obtained by the stable peak value can be stored, and accurate shading correction can always be performed.

As has been described above, the reference during latching operation of the peak value of the reference image signal is different from the reference during latching operation of the peak value of the original image signal. Therefore, peak values corresponding to the density of the actual original image can be maintained during reading of an original image whose density change is indeterminate, thereby performing excellent shading correction.

Since the shading correction data is rendered valid after the peak value is stabilized, erroneous shading correction by using inappropriate shading correction data formed based on the unstable peak value can be prevented. The shading correction data formed after a lapse of a predetermined period of time upon the ON operation of the power switch is considered valid. Therefore, formation of the shading correction data by the unstable peak value obtained immediately upon the ON operation of the power switch can be prevented, and excellent shading correction can be performed. In addition, the shading correction data is set valid only when the shading correction data formed on the previous line coincides with that on the succeeding line. Therefore, excellent shading correction by using accurate shading correction data can be performed. Furthermore, the retained potential is cleared, and shading correction data is set to be valid on the basis of the subsequently held peak value. The peak value can always be latched, and optimal shading correction can be performed.

The present invention has been described with reference to the preferred embodiment. However, the present invention is not limited to this. Various changes and modifications may be made within the scope of the appended claims.

What is claimed is:

1. An image processing apparatus comprising:
   input means for entering line by line image data obtained by reading an image;
   shading correction means for correcting variations in image data entered by said input means on a basis of correction data obtained by reading a reference surface;
   storage means for storing at least a preceding line of image data corrected by said shading correction means and a line of correction data for use in correction of a current line of image data by said shading correction means; and
   filter-processing means for performing a filter process on image data of the preceding line read out from said storage means and image data of the current line corrected by said shading correction means,
   wherein the correction data used to correct the current line is read out in parallel with the read out of the image data of the preceding line from said storage means.

2. An apparatus according to claim 1, wherein said storage means stores image data of a plurality of lines.

3. An apparatus according to claim 1, wherein said storage means stores the correction data associated with pixels of identical positions at identical addresses.

4. An apparatus according to claim 1, wherein said storage means stores again the correction data read out for correcting the image data.

5. An image processing apparatus comprising:
   input means for entering line by line image data obtained by reading an image;
   storing means for storing a plurality of lines of image data entered from said input means;
   processing means for processing the plurality of lines of image data, read out in parallel from said storage means; and
   control means for controlling writing and reading out operations of said storage means as to the image data,
   wherein said control means provides such a control that a line of image data currently entered from said input means is overwritten into a memory position of said storage means from which a previously processed one of the plurality of lines of image data was read out from said storage means.

6. An apparatus according to claim 5, wherein said processing means performs image processing for the image data of a preceding line read out from said storage means and the image data of the current line input from said input means.

7. An apparatus according to claim 5, wherein said control means reads out the image data of a pixel of the same position as that of the image data input from said input means.

8. An apparatus according to claim 5, wherein said control means provides such control that when a single address is applied to said storage means, reading out and writing of the image data are carried out in turn.

9. An apparatus according to claim 5, wherein said storage means has a memory capacity corresponding to a number of lines used at one time by said processing means for processing.

10. An image processing apparatus comprising:
    input means for entering line by line image data obtained by reading an image;
    storage means for storing a plurality of lines of image data entered from said input means;
    processing means for processing the plurality of lines of image data read out in parallel from said storage means; and
    control means for controlling writing and reading out operations of said storage means as to the image data, said control means performing a reading/- writing access to an arbitrary memory position of said storage means.

wherein said control means provides such a control that a plurality of image data of corresponding pixels from contiguous lines are written in said storage means at sequential addresses, so that the image data of corresponding pixels from said contiguous lines are supplied in parallel to said processing means by reading out the image data from the sequential addresses.

11. An apparatus according to claim 10, wherein said storage means stores the image data input from said input means at a position from which the image data is read out for image processing.

12. An apparatus according to claim 10, wherein said processing means performs image processing of the image data of the plurality of lines read out from said storage means and the image data input from said input means.

13. An apparatus according to claim 10, wherein said processing means is provided with separation means for separating the plurality of image data of the same pixels on the continuous lines on a line basis.

14. An image processing apparatus comprising:

input means for entering line by line image data obtained by reading an image;

latching means for latching a peak value of the image data entered from said input means on the basis of a reference value;

forming means for forming correction data on the basis of reference image data obtained by reading a reference surface by said input means and a peak value of the reference image data latched by said latching means on the basis of a first reference value;

correction means for correcting the variations in original image data obtained by reading an original image by said input means in accordance with the correction data formed by said forming means and a peak value of the original image data latched by said latching means on the basis of a second reference value, which is different from said first reference value; and control means for controlling a latching operating of said latching means at the peak value.

15. An apparatus according to claim 14, further including storage means for storing the correction data formed by said forming meets.

16. An apparatus according to claim 14, wherein, after the lapse of a predetermined time period after a latched peak value of the image data has been reset one time, said latching means latches as a valid value a peak value of the reference image data obtained by reading the reference surface.

17. An apparatus according to claim 14, wherein said latching means performs a latching operation at a plurality of times, and when thus latched peak values result in no variations, said latching means latches as a valid value a peak value of the reference image data obtained by reading the reference surface.

18. An apparatus according to claim 14, wherein said latching means does not latch a peak value of the reference image data during reading of the reference surface by said input means at a plurality of times, and when a number of the readings of the reference surfaces by said input means reaches a predetermined number, said latching means latches as a valid value a peak value of the reference image data obtained by reading the reference surface by said input means.

* * * * *

UNITED STATES PATENT AND TRADEMARK OFFICE
CERTIFICATE OF CORRECTION

PATENT NO. : 5,267,055  Page 1 of 2
DATED : November 30, 1993
INVENTOR(S) : MASAHIRO SAKAMOTO, ET AL.

It is certified that error appears in the above-identified patent and that said Letters Patent is hereby corrected as shown below:

On title page, item [56] "References Cited" insert

U.S. Patent Documents,
    Insert, --4,947,445  8/1990 Sakamoto et al.--.

On drawing

SHEET 2 OF 16

Figure 4:
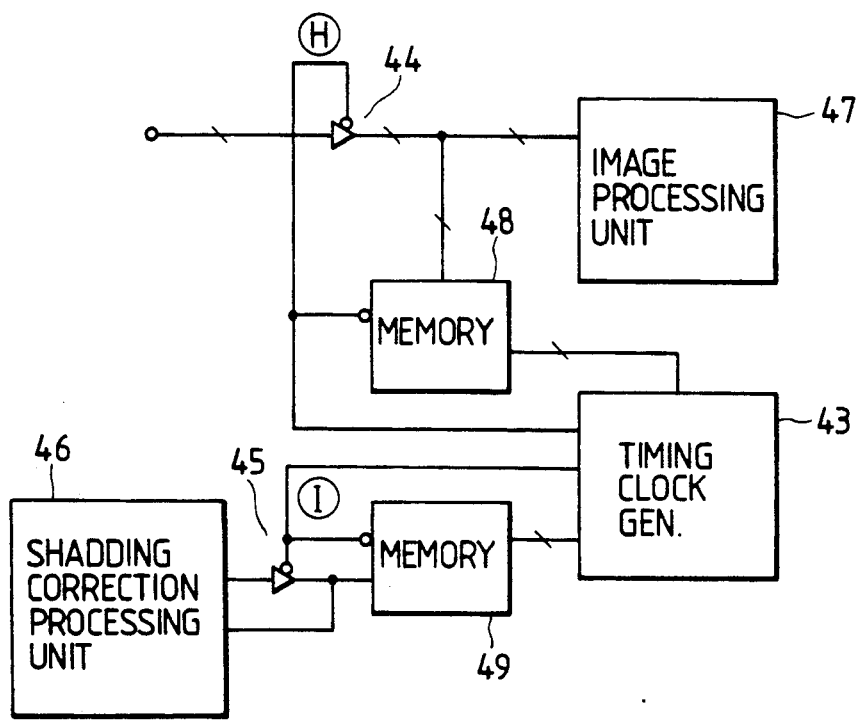
FIG. 4 is a block diagram of a conventional shading processing circuit.
Figure 5:
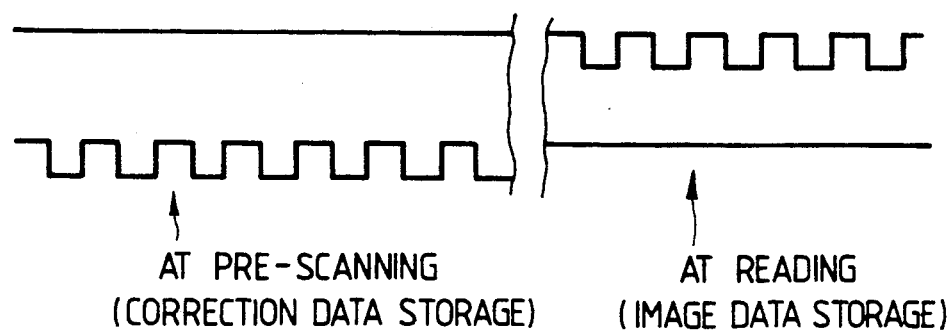
FIG. 5 is a timing chart of an image processing operation of the circuit shown in FIG. 4.
Figure 3:
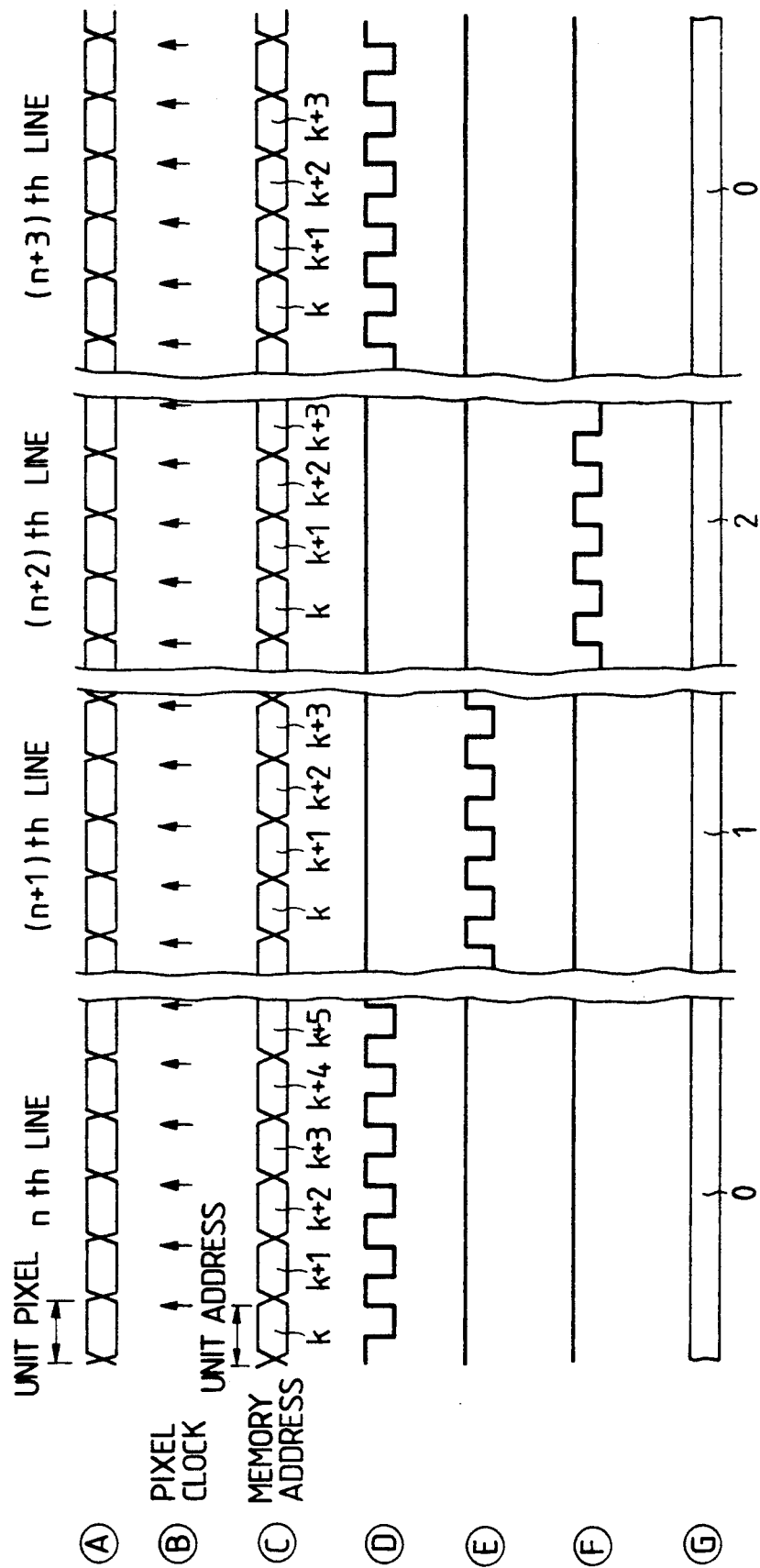
FIG. 3 is a timing chart of conventional image processing operations.
Figure 6:
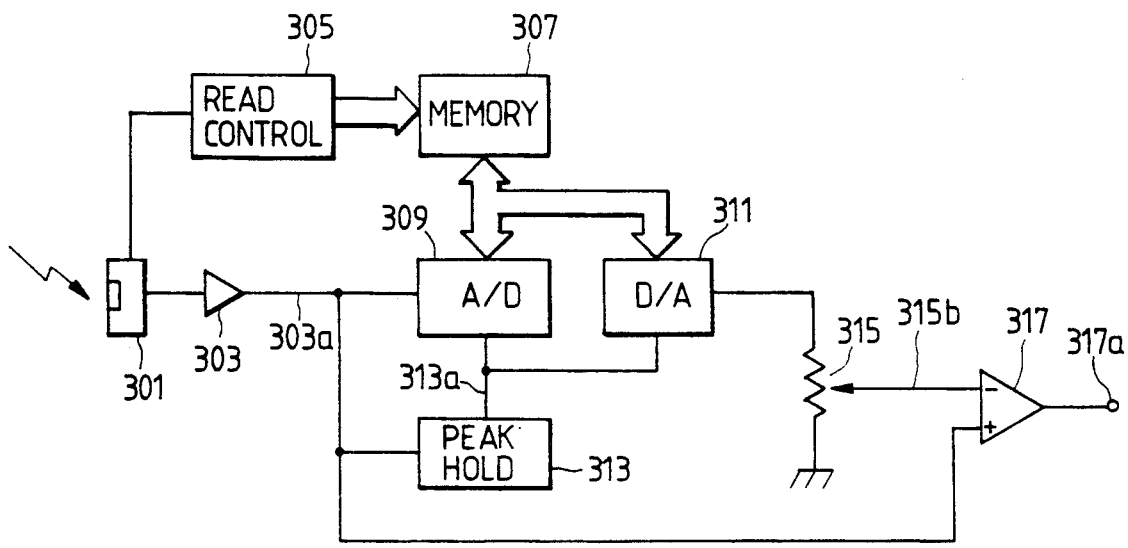
FIG. 6 is a block diagram showing an arrangement of a conventional reading circuit.
Figure 7:
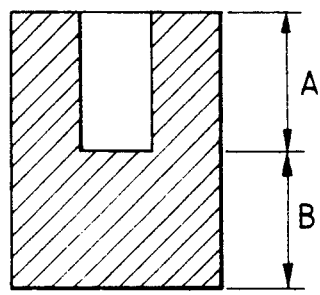
FIG. 7 is a view showing an original image.
Figure 8:
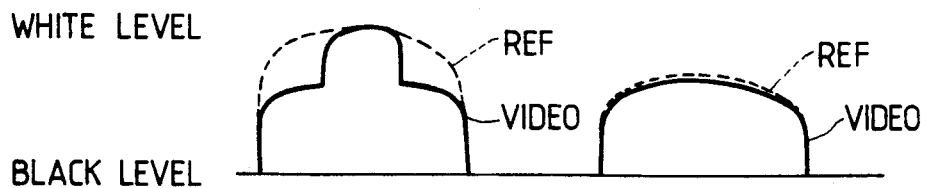
FIG. 8 is a view showing an original image read signal.

FIG. 4, "SHADDING" should read --SHADING--.

SHEET 6 OF 16

FIG. 10, "SHADDING" should read --SHADING--.

COLUMN 9

Line 65, "reversed" should read --reversed order--.

COLUMN 10

Line 20, "e.g., k," should read --e.g., ...k,--.
    Line 65, "and are" should read --and 12 are--.

COLUMN 15

Line 5, "peak" should read --peak- --.

COLUMN 16

Line 10, "peakhold" should read --peak-hold--.
    Line 31, "employs" should read --employed--.
    Line 62, "peak hold" should read --peak-hold--.
    Line 65, "peak hold" should read --peak-hold--.

UNITED STATES PATENT AND TRADEMARK OFFICE
CERTIFICATE OF CORRECTION

PATENT NO. : 5,267,055
DATED : November 30, 1993
INVENTOR(S) : MASAHIRO SAKAMOTO, ET AL.

It is certified that error appears in the above-identified patent and that said Letters Patent is hereby corrected as shown below:

COLUMN 18

Line 63, "circuit 43." should read --circuit 243.--.

COLUMN 20

Line 13, "read out" (second occurrence) should read --read-out--.

COLUMN 21

Line 2, "means." should read --means,--.

Signed and Sealed this

Sixteenth Day of August, 1994

Attest:

BRUCE LEHMAN

Attesting Officer      Commissioner of Patents and Trademarks